(12) United States Patent  
Beer

(10) Patent No.: US 7,891,156 B2
(45) Date of Patent: Feb. 22, 2011

(54) PACKAGING APPARATUS AND METHOD OF PACKAGING

(75) Inventor: Philip Roland Beer, Craigville, IN (US)

(73) Assignee: Rethceif Enterprises, LLC, Bluffton, IN (US)

( * ) Notice: Subject to any disclaimer, the term of this patent is extended or adjusted under 35 U.S.C. 154(b) by 144 days.

(21) Appl. No.: 12/383,391

(22) Filed: Mar. 24, 2009

(65) Prior Publication Data

US 2010/0242410 A1    Sep. 30, 2010

(51) Int. Cl.
B65B 31/00 (2006.01)
B65B 63/02 (2006.01)
B65B 39/04 (2006.01)
B65B 9/20 (2006.01)

(52) U.S. Cl. .................... 53/433; 53/438; 53/450; 53/511; 53/529; 53/550

(58) Field of Classification Search ............ 53/433, 53/436, 438, 439, 450, 481, 511, 528–530, 53/550, 371.7, 372.7, 258; 100/179, 189; 493/302, 308; B65B 39/04

See application file for complete search history.

(56) References Cited

U.S. PATENT DOCUMENTS

| | | | | |
|---|---|---|---|---|
| 1,456,576 A | * | 5/1923 | Robinson | 53/258 |
| 1,702,704 A | * | 2/1929 | Phillips | 53/372.7 |
| 1,913,828 A | * | 6/1933 | Brennan | 53/530 |
| 2,179,685 A | | 11/1939 | Chalmers | |
| 2,413,556 A | * | 12/1946 | Fourness et al. | 53/438 |
| 2,580,833 A | * | 1/1952 | Piper et al. | 53/529 |
| 2,628,753 A | | 2/1953 | Field | 53/258 |
| 2,773,773 A | * | 12/1956 | Harder et al. | 53/450 |
| 3,513,629 A | | 5/1970 | Hoagland et al. | |
| 3,528,214 A | * | 9/1970 | Calvano | 53/511 |
| 3,738,081 A | | 6/1973 | Heinzer | |
| 3,897,530 A | | 7/1975 | Leathers | |
| 4,106,262 A | | 8/1978 | Aterianus | |
| 4,272,944 A | | 6/1981 | Suga | |
| 4,625,495 A | | 12/1986 | Holovach | |
| 4,677,909 A | * | 7/1987 | Beesley et al. | 100/229 A |
| 5,177,935 A | | 1/1993 | Jones et al. | |
| 5,226,269 A | * | 7/1993 | Stoltenberg | 53/436 |
| 5,447,012 A | | 9/1995 | Kovacs et al. | |
| 5,524,420 A | * | 6/1996 | Ikuta | 53/450 |
| 5,564,261 A | * | 10/1996 | Kiner | 53/439 |
| 5,566,526 A | * | 10/1996 | Suga | 53/550 |
| 5,694,742 A | * | 12/1997 | Elliott et al. | 53/436 |

(Continued)

Primary Examiner—Stephen F Gerrity
(74) Attorney, Agent, or Firm—George Pappas

(57) ABSTRACT

A packaging apparatus including a receptacle, a ram, a film dispensing assembly and first and second elongate members. The receptacle defines a central axis and has a dispensing end with first and second substantially linear and parallel opposed edges that define an axial limit of the dispensing end. The plastic film material forms a film tube about the receptacle. The first and second elongate members are substantially parallel with the first and second edges. In operation, the ram is extended to eject the batch of material through the dispensing end into the film tube. Retracting the ram forms a partial vacuum within the film tube between the batch of material and the ram. The first and second elongate members compressively engage the film tube between the batch of material and the dispensing end and thereby form folded flaps in the film tube. A method of packaging is also disclosed.

21 Claims, 19 Drawing Sheets

U.S. PATENT DOCUMENTS

| | | |
|---|---|---|
| 5,966,907 A | 10/1999 | Julius |
| 6,619,018 B1 * | 9/2003 | Sasaki .................... 53/511 |
| 7,076,930 B2 | 7/2006 | Rimondi |
| 7,165,378 B2 | 1/2007 | Rimondi |
| 7,308,780 B2 | 12/2007 | Rimondi |
| 2002/0124533 A1 * | 9/2002 | Schmetzer et al. ............ 53/438 |
| 2005/0028484 A1 * | 2/2005 | Littlewood .................... 53/439 |
| 2007/0186512 A1 | 8/2007 | Rimondi |
| 2009/0241474 A1 * | 10/2009 | Actis ........................ 53/456 |
| 2010/0146908 A1 * | 6/2010 | Honegger ................... 53/439 |

* cited by examiner

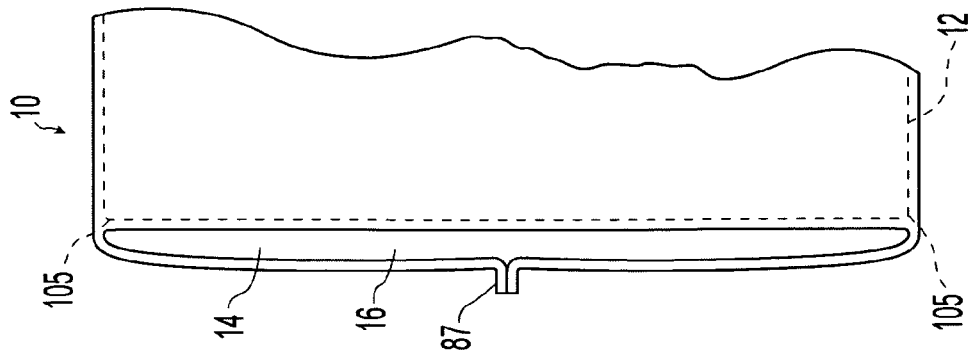
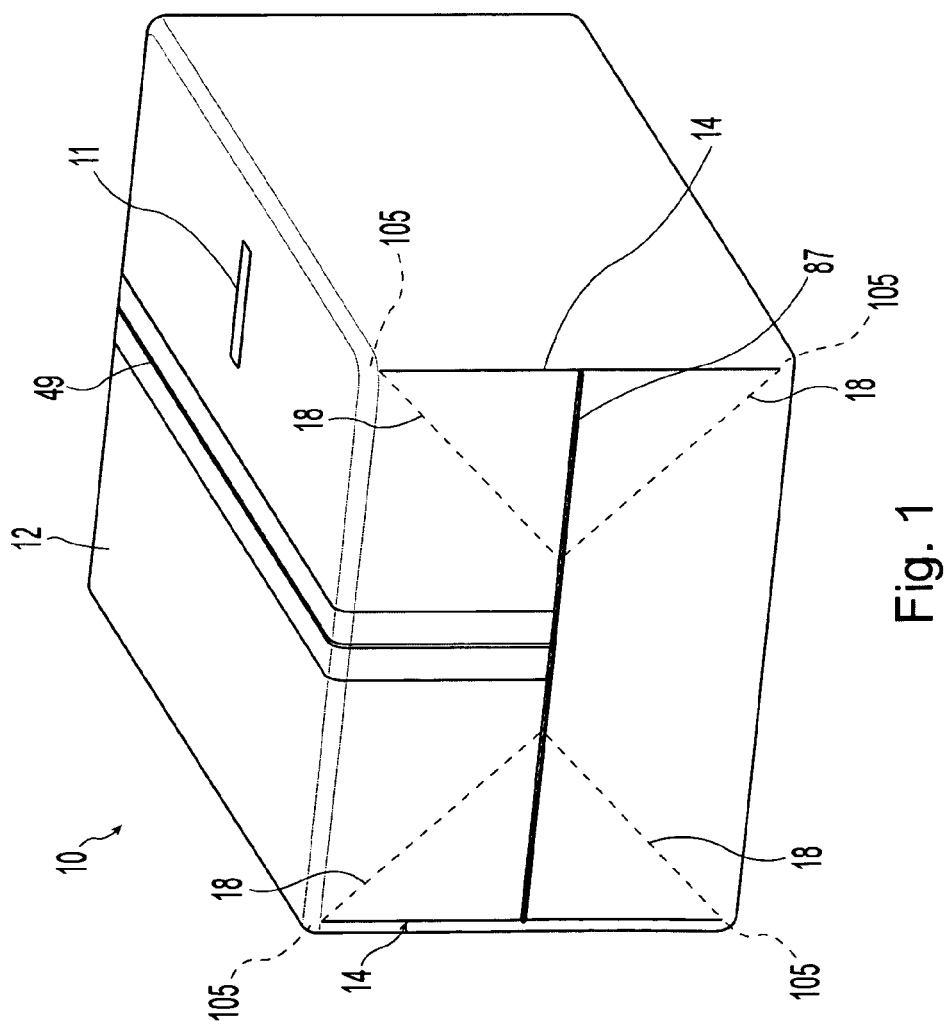

PACKAGING APPARATUS AND METHOD OF PACKAGING

BACKGROUND OF THE INVENTION

1. Field of the Invention

The present invention relates to packaging machines and, more particularly, to packaging machines that are capable of forming folded flaps or gussets when packaging a product.

2. Description of the Related Art.

One type of packaging machine, commonly referred to as form, fill and seal (FFS) packaging machines, are typically used to bag loose fill material. Such FFS machines will typically have a forming tube in which the loose material is placed. Plastic film from a roll is formed into a film tube having one closed end. The film tube is positioned on the forming tube and the material is forced into the film tube adjacent the closed end. The film tube is then sealed to enclose the loose material in the film tube and thereby form a packaged product. During this sealing process, the packaging machine will also typically form a closed end on the remaining film tube material so that it may receive the next batch of loose material.

It is generally desirable for the packaged product to have an appealing appearance. It is known to form folded flaps, also commonly referred to as gussets, in the film tube when sealing the film tube to enhance the appearance of the packaged product. Providing an FFS packaging machine with such gusset-forming capabilities, however, increases the complexity and cost of the packaging machine. Providing it with such capabilities will also typically slow the operating speed of the machine. It can also be quite difficult to form gussets having a neat and aesthetic appearance. A packaging machine with improved gusset-forming capabilities is desirable.

SUMMARY OF THE INVENTION

The present invention provides a packaging machine with improved gusset-forming capabilities.

The invention comprises, in one form thereof, an apparatus for packaging a batch of material within a plastic film material. The apparatus includes a receptacle, a ram, a film dispensing assembly and first and second elongate members. The receptacle is adapted to receive the batch of material, defines a central axis and has a dispensing end. The dispensing end defines an opening and includes first and second substantially linear opposed edges. The first and second edges are disposed substantially parallel and on opposite sides of the central axis. The dispensing end also includes third and fourth edges extending between the first and second edges which are disposed on opposite sides of the central axis. The first and second edges define an axial limit of the receptacle and project axially beyond a central portion of the third and fourth edges. The ram is axially moveable within the receptacle and is engageable with the batch of material to thereby displace the batch of material along the central axis. The film dispensing assembly dispenses the plastic film material and forms the plastic film material into a film tube about the receptacle. The first and second elongate members are disposed substantially parallel with the first and second edges. The elongate members are moveable toward and away from each other in a direction substantially perpendicular to the central axis. In operation, the apparatus axially extends the ram to eject the batch of material through the dispensing end into the film tube and subsequently retracts the ram into the receptacle to form at least a partial vacuum within the film tube between the batch of material and the ram. The first and second elongate members are moved toward each other in a closing stroke to compressively engage the film tube between the batch of material and the dispensing end and the partial vacuum is present in the film tube for at least a portion of the closing stroke to thereby form folded flaps in the film tube.

The invention comprises, in another form thereof, a method of packaging a loose material. The method includes providing a receptacle defining a central axis and having a dispensing end. The dispensing end defines an opening and includes first and second substantially linear opposed edges. The first and second edges are disposed substantially parallel and on opposite sides of the central axis. The dispensing end also includes third and fourth edges that extend between the first and second edges and are disposed on opposite sides of the central axis. The first and second edges define an axial limit of the receptacle and projecting axially beyond a central portion of the third and fourth edges. A batch of loose material is placed in the receptacle and a plastic film tube is formed about the receptacle with the film tube including a first closed end positioned proximate the dispensing end of the receptacle. A ram is extended within the receptacle and through the dispensing end to eject the batch of material through the dispensing end into the film tube and simultaneously axially advance the film tube. The batch of material is disposed within the film tube adjacent the first closed end at a position axially spaced from the dispensing end after the ejection of the batch of material through the dispensing end. First and second elongate members that are disposed substantially parallel with the first and second edges of the dispensing end are provided and are moveable toward and away from each other in a direction substantially perpendicular to the central axis. The method also includes forming at least one folded flap in the film tube by moving the first and second elongate members toward each other in a closing stroke and compressively engaging the first and second elongate members with the film tube at a location between the ejected batch of material and the dispensing end of the receptacle while simultaneously forming at least a partial vacuum in the film tube between the batch of material and the dispensing end of the receptacle during at least a portion of the closing stroke. Slack is provided in the film tube between the ejected batch of material and the dispensing end during the step of forming the folded flap.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein:

FIG. 1 is a perspective view of a package of material formed with a packaging apparatus disclosed herein.

FIG. 1a is a partial side view of the package of material.

Figure 2:
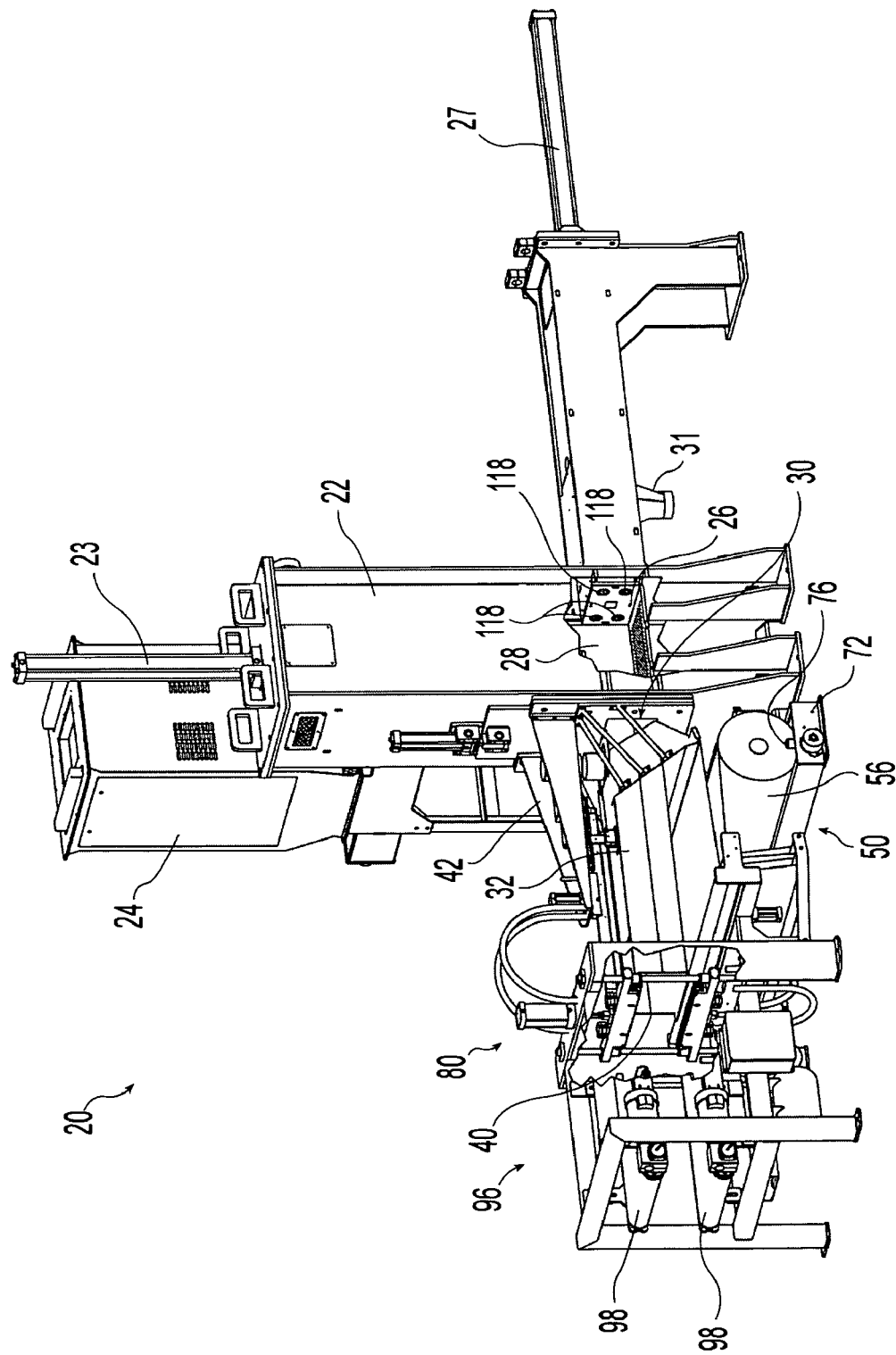
FIG. 2 is a partially cutaway perspective view of a packaging apparatus.
Figure 4:
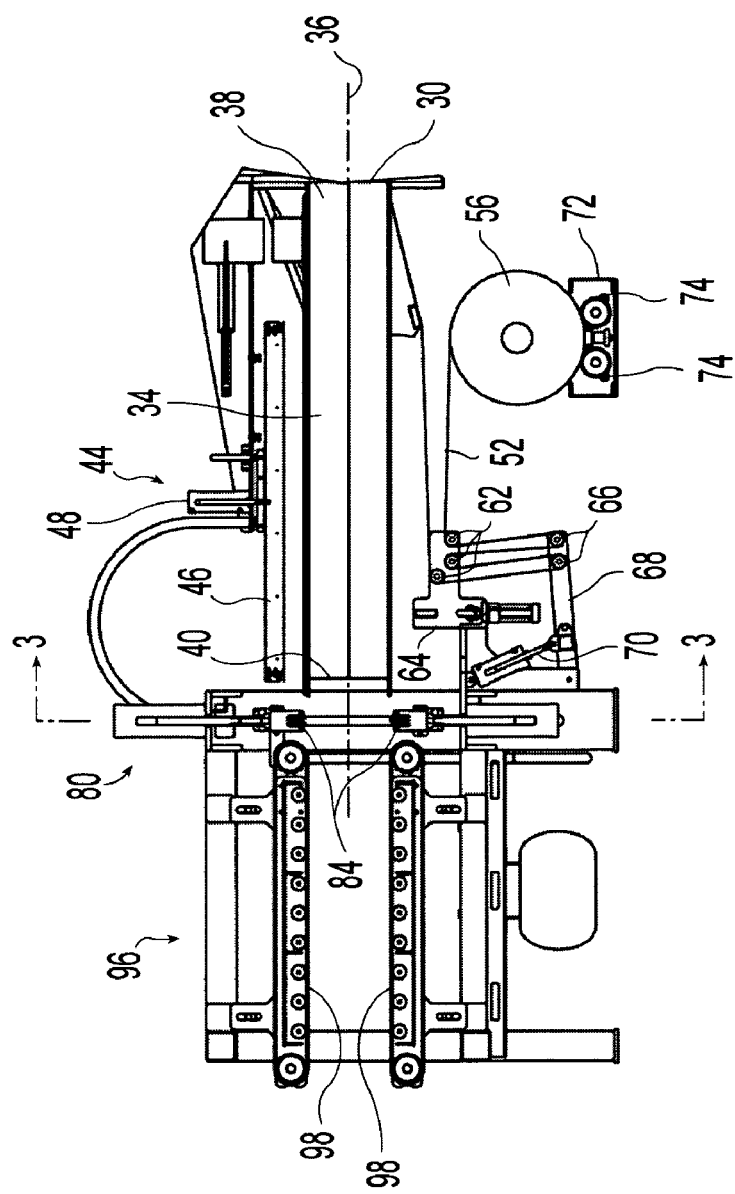
FIG. 4 is a cross sectional view taken along line 4-4 of FIG. 3.
Figure 3:
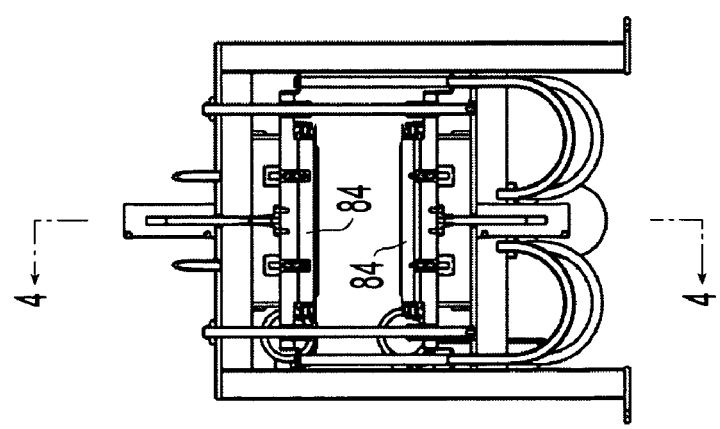
FIG. 3 is a cross sectional view taken along line 3-3 of FIG. 4.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

An apparatus 20 for packaging a loose material in accordance with the present invention is shown in FIG. 2. FIG. 1 illustrates a package 10 of loose material 12 that is produced by apparatus 20.

Apparatus 20 includes a compression chamber 22 having a conventional sheet steel construction. Compression chamber 22 receives loose material from hopper 24. In the illustrated embodiment, material 12 is a loose compressible material. Examples of such loose compressible material that can be packaged by apparatus 20 include fiberglass insulation, cellulose insulation, rockwool insulation, hydroseed mulch, wood shavings, and straw. The present invention is not, however, limited to use with these exemplar materials and various other materials may also be packaged using apparatus 20. A conventional augur (not shown) can be used to feed material 12 into chamber 22. Advantageously, a pre-weigh augur that inputs a known weight of material 12 for each packaging cycle is used with apparatus 20. For free flowing materials a dump chute instead of augur may be used to input material into chamber 22.

A compression ram (not shown) is mounted within compression chamber 22 is reciprocated in a vertical direction with hydraulic cylinder 23. The hydraulically powered compression ram compresses the loose material into the lower portion 28 of the compression chamber 22 adjacent ejection ram 26. In the illustrated embodiment, ejection ram 26 is a hydraulically powered ram that is moved in a horizontal reciprocal motion with hydraulic cylinder 27.

Vent structures 31 provide communication between the surrounding environment and the back side of the compression ram and ejection ram 26. Vent structures 31 allow the air pressure on the back side of the rams to remain at the ambient air pressure as the rams are extended and retracted and equalize the air pressure at other locations within apparatus 20 as it operates. It is noted that while the illustrated embodiment employs a hydraulic system for driving the compression ram and ejection ram 26, various other known driving means, such as a pneumatic system or servo motors, may alternatively be employed with one or more of these rams and the other hydraulically powered features of apparatus 20.

After the compression ram has compressed material 12 into a lower portion 28 of compression chamber 22 proximate outlet port 30, ejection ram 26 is advanced and discharges material 12 through outlet port 30 into a receptacle 32. The loose material 12 will generally conform to the shape of the interior of receptacle 32 which is also referred to herein as a forming tube.

Receptacle/forming tube 32 receives the material 12 discharged through outlet port 30 by action of ejection ram 26. In the illustrated embodiment, forming tube 32 is a steel tube having a generally rectangular cross section that defines an inner volume 34. Forming tube 32 also defines a central axis 36 and has a first end 38 in communication with outlet port 30 and an opposite dispensing end 40. As discussed in greater detail below, ejection ram 26 extends into and through forming tube 32 such that the batch of material 12 discharged through outlet port 30 is subsequently ejected from inner volume 34 through dispensing end 40.

A film dispensing assembly 50 is utilized to feed plastic film 52 about forming tube 32 and includes a folding hood 54 secured to apparatus 20 above forming tube 32 near its inlet end 38. Folding hood 54 is used to guide and fold plastic film 52 from roll 56 about forming tube 32. Longitudinally extending thermal sealing device 44 is then used to join the opposite edges of the film 52 along a longitudinal seam 49 and thereby form plastic film 52 into a sleeve or film tube 58 that fully surrounds forming tube 32. In the illustrated embodiment, film roll 56 is a heat sealable polyethylene flat film roll with film 52 having a thickness between about 1.5 and 8 mils. Various other types and thicknesses of films, however, may also be used with the present invention.

Support rods 55 are used to support folding hood 52. Support rods 55 are attached at one end to an exterior surface of compression chamber 22 and are attached at their other end to the edge of folding hood 54 opposite compression chamber 22. At least a portion of the edge of folding hood 54 proximate compression chamber 22 is spaced from the exterior surface of compression chamber 22 to allow for the travel of film 52 between hood 54 and compression chamber 22.

Longitudinal sealing device 44 also forms a part of film dispensing assembly 50. Sealing device 44 is an elongate thermal sealing device that is mounted on cantilever bracket 42 which extends outwardly from compression chamber 22 above forming tube 32. Sealing device 44 includes an elongate thermal sealing member 46 that is raised and lowered relative to forming tube 32 by a hydraulic cylinder 48. When in a raised position, sealing member 46 allows for the movement of plastic film along the exterior of forming tube 32. When in the lowered position, sealing member 46 presses overlapping portions of the plastic film against an uppermost surface of forming tube 32. When sealing member 46 is lowered and heated, the overlapping portions of the plastic film will be welded together by sealing member 46 to form a longitudinal seam 49. The use of such thermal sealing members to join together plastic film material is well known to those having ordinary skill in the art.

After film tube 58 has been formed about forming tube 32 and a batch of material 12 has been discharged from compression chamber 22 into forming tube 32, ejection ram 26 can be further extended through dispensing end 40 to thereby eject material 12 from inner volume 34 through dispensing end 40 into film tube 58.

When ejection ram 26 is extended through inner volume 34 along central axis 36, it ejects the batch of material 12 located within inner volume 34 outward through dispensing end 40. As the material 12 is ejected, it engages the closed end 60 of the plastic film tube 58 that is positioned adjacent dispensing end 40. As the dispensed material engages closed end 60 of film tube 58 and is pushed axially away from dispensing end 40 by the extension of ram 26, this action draws additional plastic film 52 about forming tube 32 to replace the film tube 58 into which the material 12 has been deposited.

As previously mentioned, a film dispensing assembly 50 regulates the dispensing of plastic film 52 and includes folding hood 54 and longitudinal sealing device 44. The illustrated film dispensing assembly 50 also includes an upper set of rollers 62 mounted on fixed bracket 64 and a lower set of rollers 66 mounted on pivotal lower bracket 68 which is moved by a hydraulic cylinder 70 to draw film off of film roll 56. Film roll 56 is located within carrier 72 which includes two elongate parallel horizontal rollers 74 on which film roll 56 rests. Carrier 72 also includes two vertically oriented rollers 76 which limit longitudinal movement of film roll 56. When plastic film 52 is pulled, rollers 74 allow film roll 56 to rotate and thereby dispense plastic film 52.

Plastic film 52 is routed from film roll 56 in serial order about an upper roller 62, a lower roller 66, an upper roller 62, a lower roller 66 and then another upper roller 62 before engaging folding hood 54. By raising and lowering the lower bracket 68 with hydraulic cylinder 70, the distance between the upper and lower rollers 62, 66 can be reduced (by raising lower bracket 68) or increased (by lowering lower bracket 68) and thereby either reduce or increase the length of the plastic film 52 that is wrapped about and extends between these two sets of rollers. Lower rollers 66 can also be allowed to freely move up and down due to tension on film material 52. When apparatus 20 is operating, lower bracket 68 will be moved from its lower position to it upper position to allow plastic film 52 to more freely advance toward folding hood 54 and along forming tube 32. After the plastic film 52 has been advanced onto forming tube 32, the lower bracket 68 can then lowered to pull additional film 52 off of film roll 56.

After material 12 has been ejected into film tube 58, a lateral jaw assembly 80 is closed behind the ejected material 12. As discussed in greater detail below, material 12 is then enclosed within the film material and the film tube 58 is folded and sealed to form package 10. A new closed end 60 is also formed adjacent dispensing end 40 for engagement with the next batch of material 12 to be ejected from forming tube 32.

Figure 15:
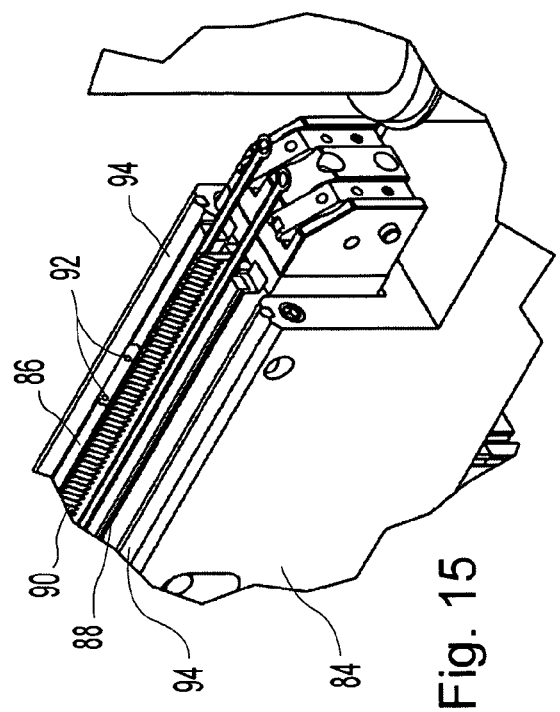
FIG. 15 is an enlarged view of the Detail View area of FIG. 14 showing an elongate sealing member.
Figure 16:
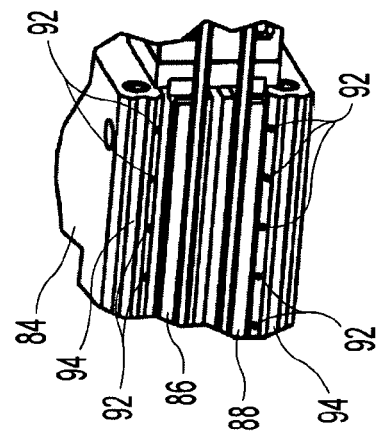
FIG. 16 is a perspective view of a portion of an elongate sealing member.
Figure 14:
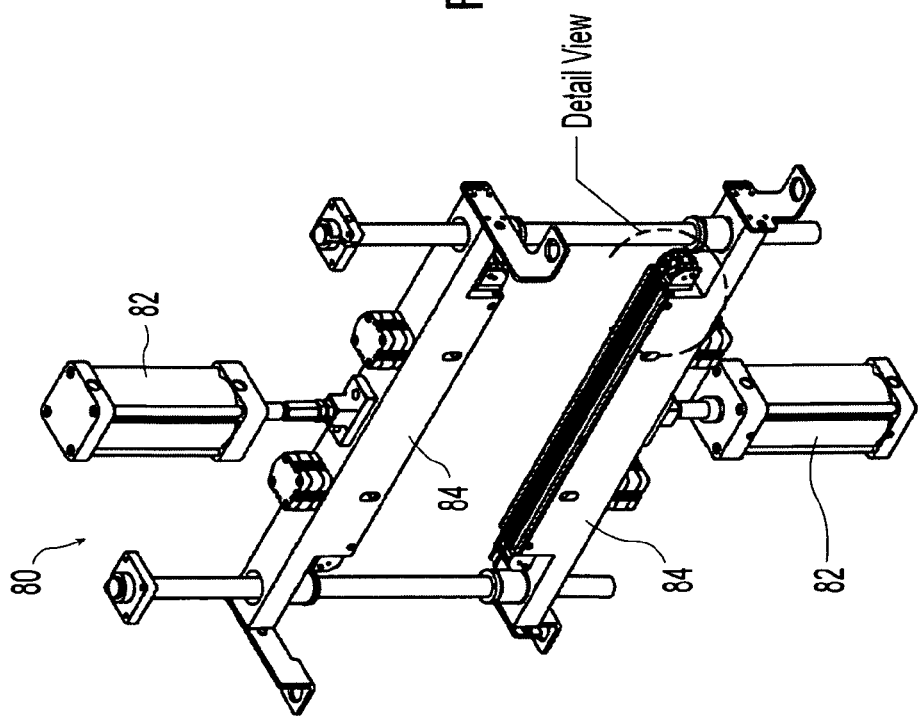
FIG. 14 is perspective view of the jaw assembly.

Lateral jaw assembly 80 is best seen in FIGS. 14-16. Jaw assembly 80 includes vertically oriented upper and lower hydraulic cylinders 82. Attached to hydraulic cylinders 82 are two laterally extending elongate jaw members 84. Each of the elongate members 84 includes two retractable, laterally extending elongate thermal sealing members 86, 88 and a retractable, laterally extending knife or mechanical severing member 90 that is located between the two thermal sealing members 86, 88. Elongate jaw members 84 also include cooling orifices 92 and laterally extending rubber cords 94. Lateral jaw assembly 80 is located between dispensing end 40 and a conveyor system 96. Conveyor system 96 has two conveyor tracks 98 for gripping opposing surfaces of packages 10.

Figure 10:
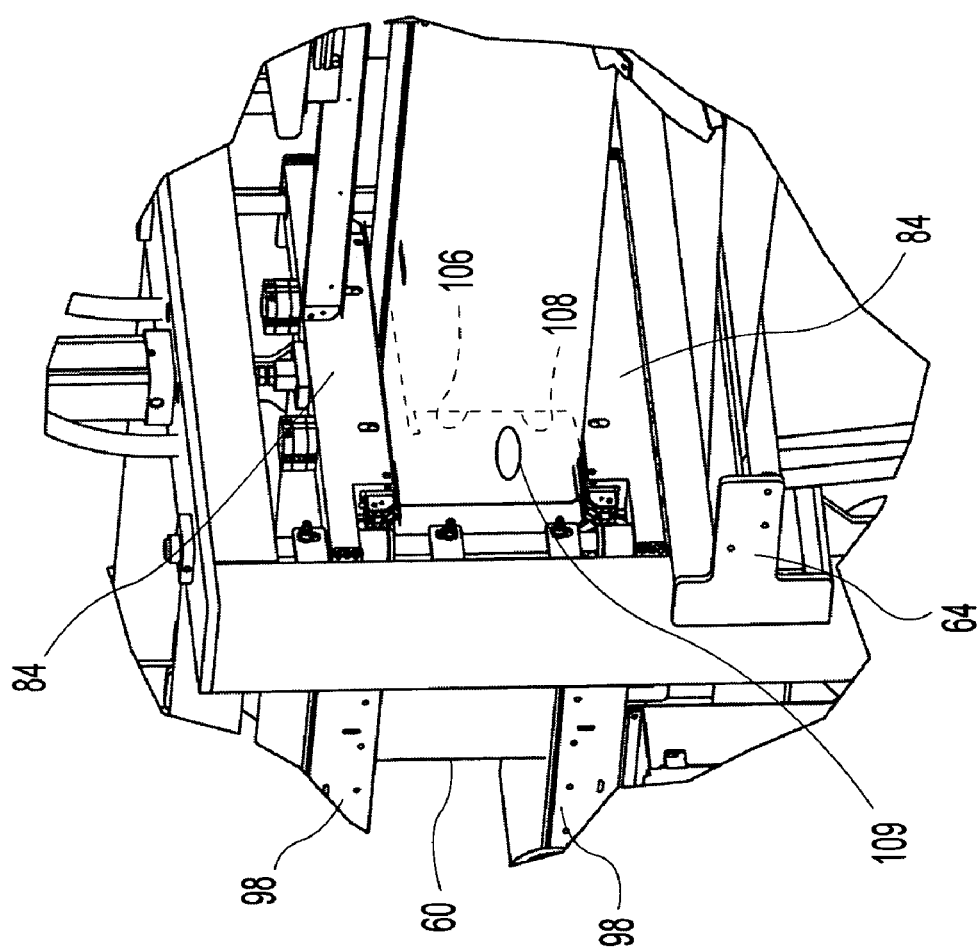
FIG. 10 is a perspective view of the dispensing end area of the assembly.
Figure 11:
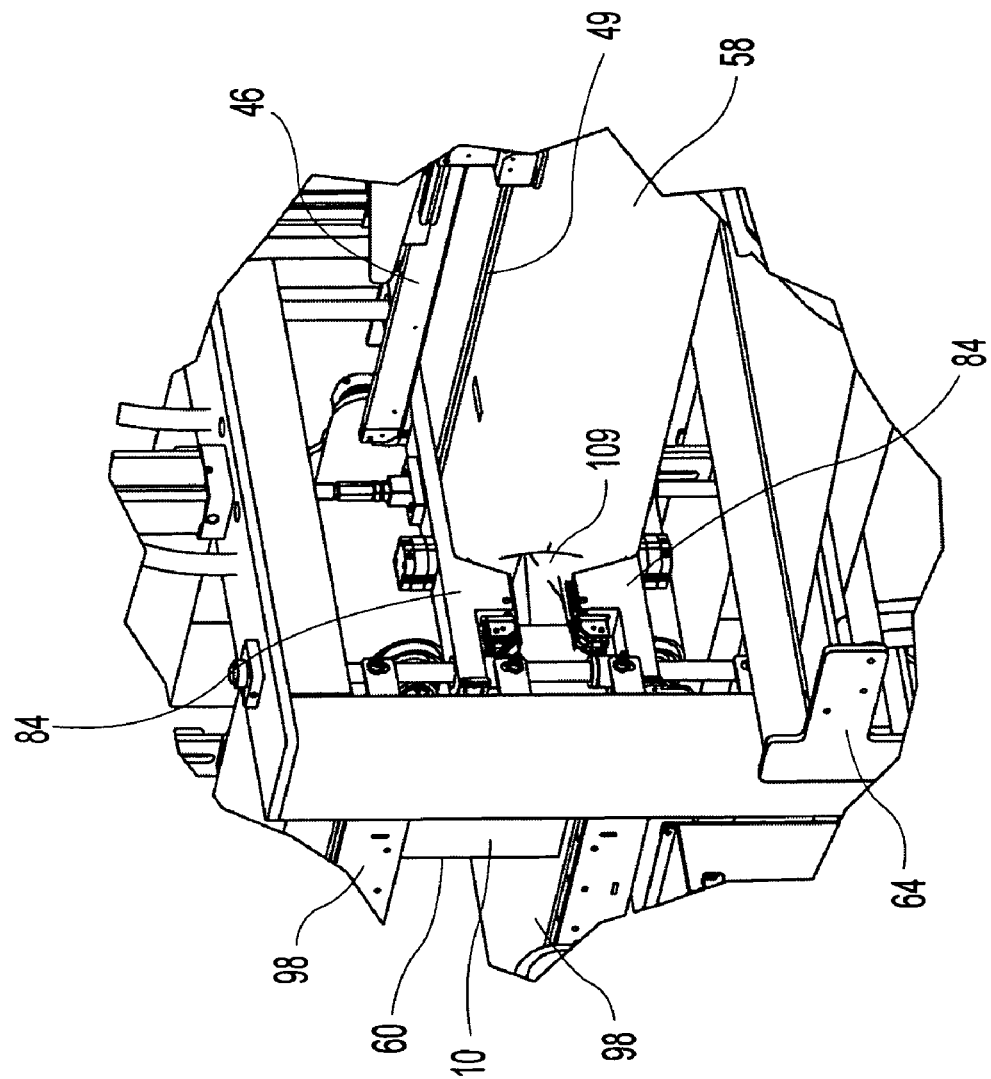
FIG. 11 is a perspective view of the dispensing end area.
Figure 12:
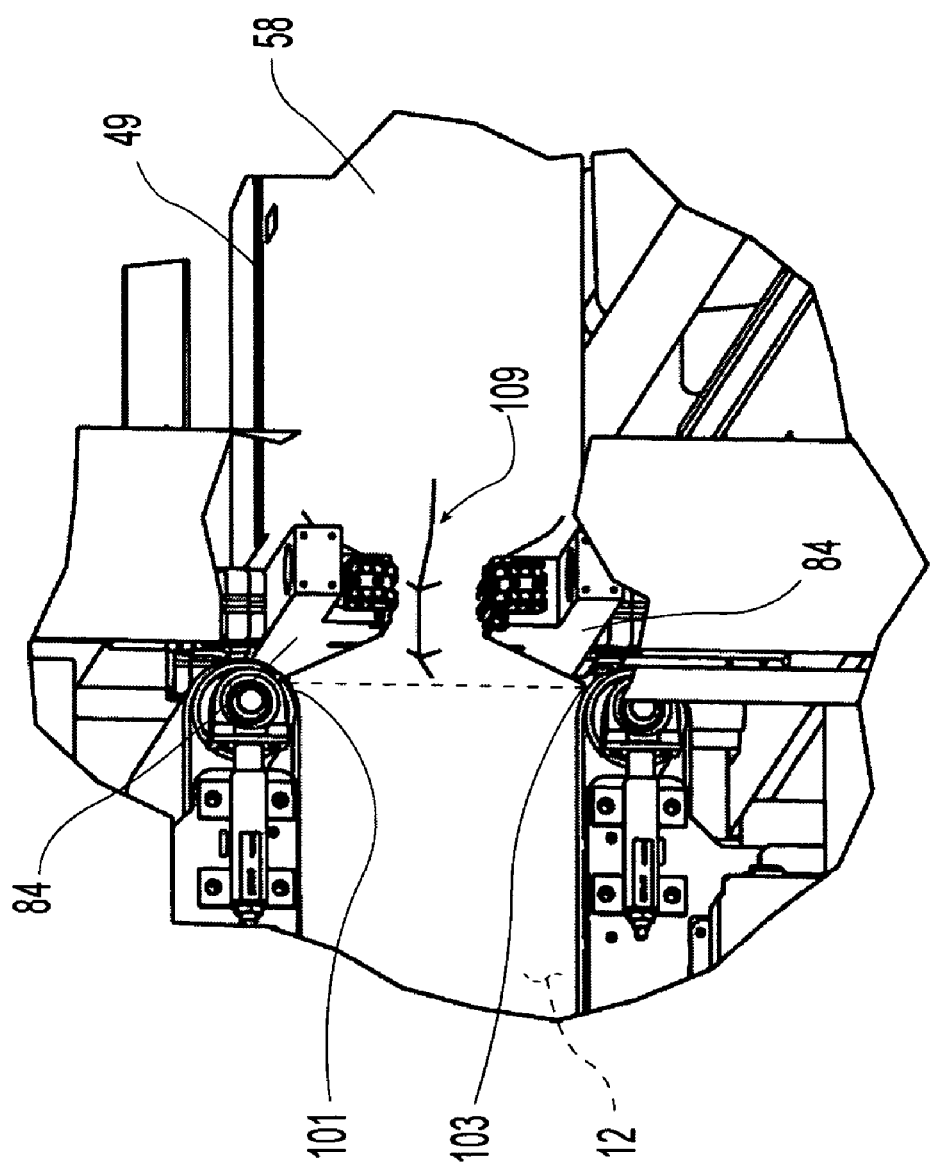
FIG. 12 is a partial cutaway view of the dispensing end area.
Figure 13:
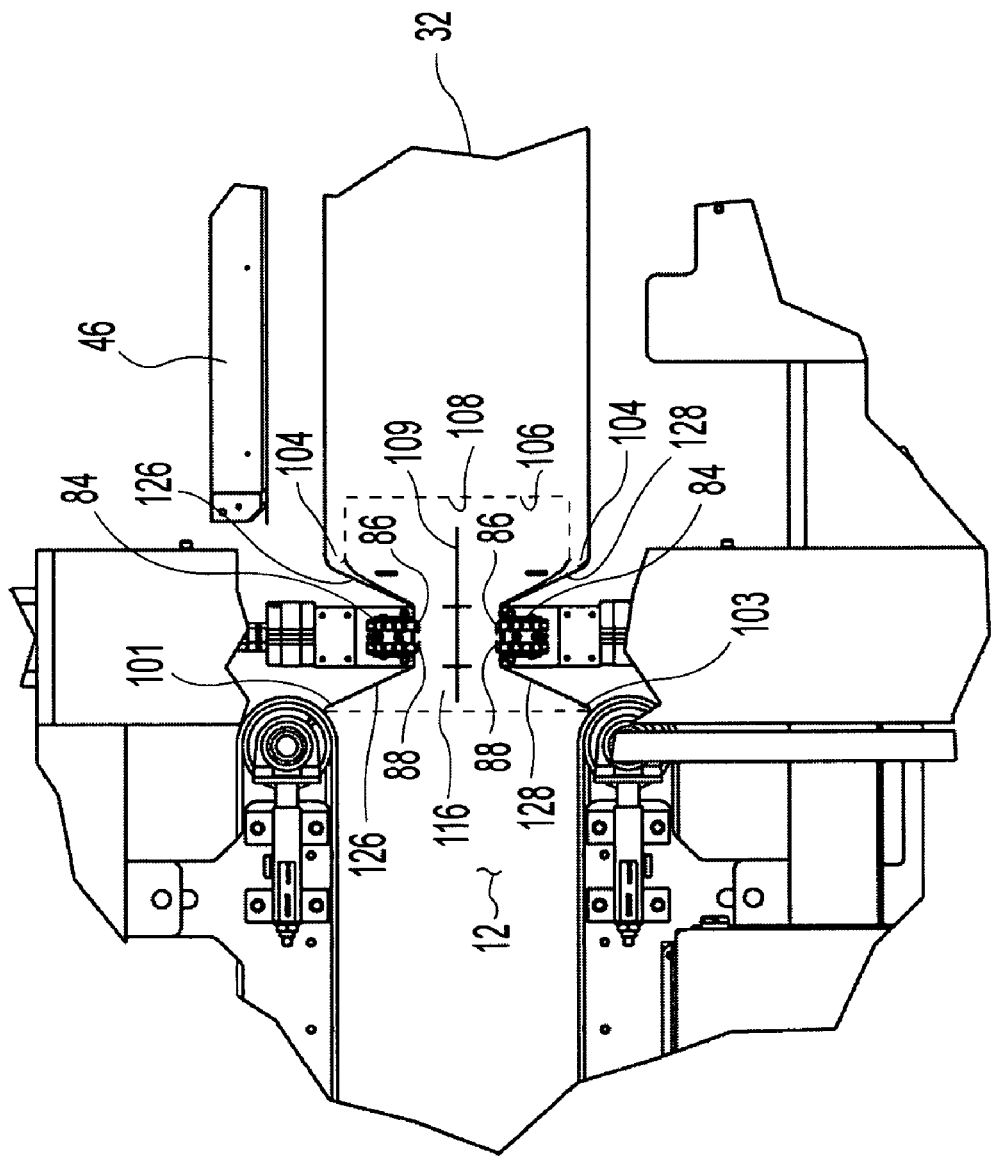
FIG. 13 is a partial cutaway view of the dispensing end area.
Figure 19:
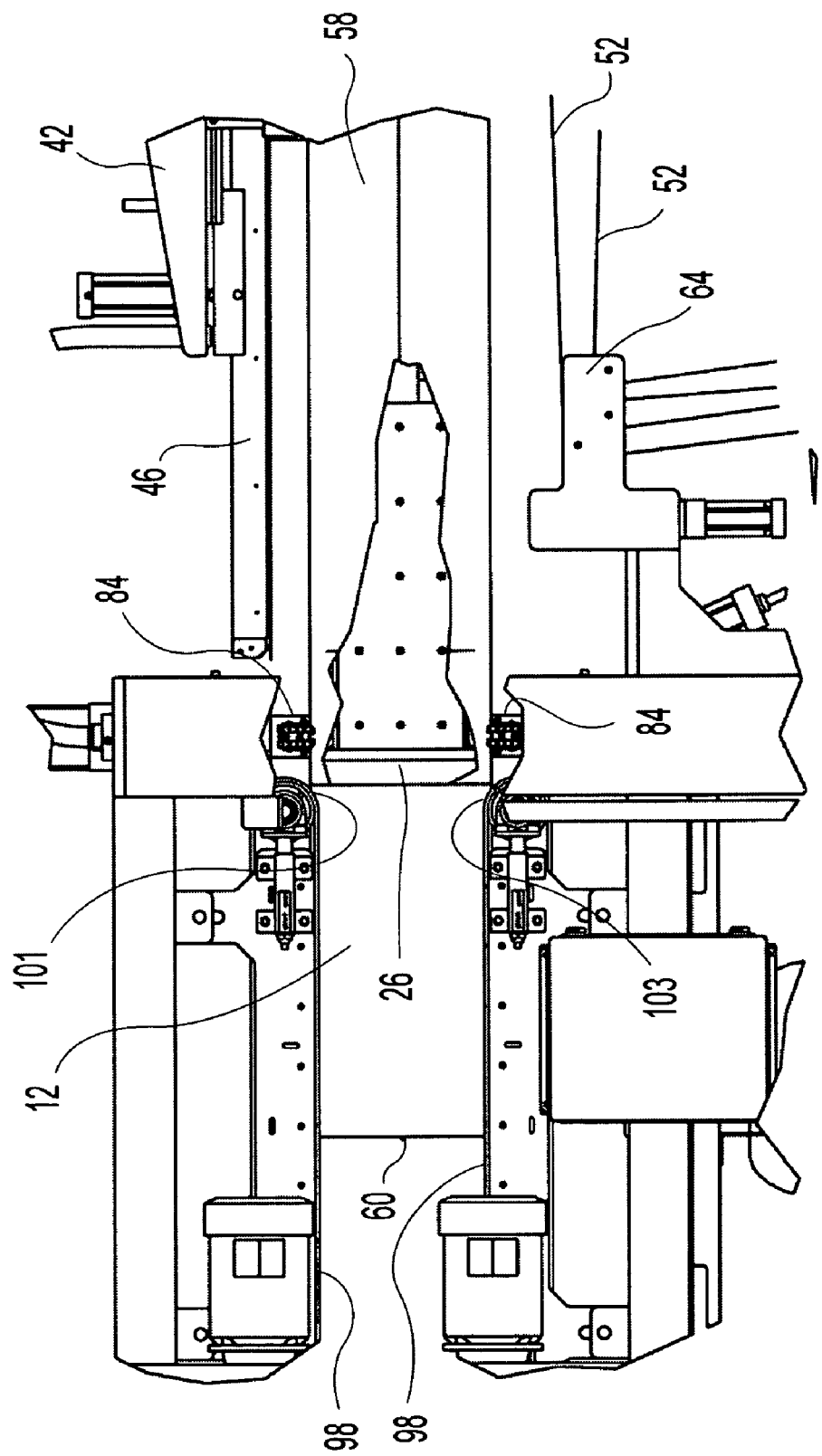
FIG. 19 is a partial cutaway side view of the dispensing end area.

When ram 26 is extended through dispensing end 40, jaw members 84 are spaced apart by a sufficient amount to allow ram 26 and ejected material 12 to pass between the two elongate jaw members 84. After material 12 has been ejected from inner volume 34 of forming tube 32 and is gripped between the two conveyor tracks 98 of conveyor system 96, the film tube 58 which surrounds the ejected material 12 will still be continuous with the plastic film material 52 located on forming tube 32 and the ejected batch of material 12 will be axially spaced from dispensing end 40. Ram 26 is then retracted through dispensing end 40. FIG. 19 illustrates the point where ram 26 has pushed material 12 into a position between conveyor tracks 98 and has begun to be retracted toward dispensing end 40 but has not yet cleared jaw assembly 80. After ram 26 has been retracted and no longer extends through jaw assembly 80, hydraulic cylinders 82 are extended so that elongate jaw members 84 compressively engage film tube 58 and pinch film tube 58 together between ejected material 12 and dispensing end 40 of forming tube 32. FIG. 10 illustrates the point at which ram 26 has been retracted into forming tube 32 and elongate members 84 have not yet been advanced toward each other. FIGS. 11-13 show elongate members 84 in the process of being moved together. As discussed in greater detail below, the formation of a partial vacuum within film tube 58 due to the retraction of ram 26 combined with the configuration of dispensing end 40 and closure of jaws 84 forms folded flaps in film tube 58.

After jaw assembly 80 has been fully closed, elongate members 84 will firmly engage the film tube 58 between members 84. Thermal sealing members 86, 88 are then engaged with and heated to thermally join the plastic film squeezed between the sealing members 86, 88 along two separate seams 87 that extend laterally across the full width of film tube 58. More specifically, after jaw assembly 80 has been closed and elongate members 84 have firmly clamped film tube 58 therebetween, sealing members 86, 88 are engaged with film tube 58 and electrically energized to thereby form heating strips. Sealing members 86, 88 are energized for a predetermined amount of time to at least partially melt the plastic film material 52 clamped between the sealing members 86, 88. After the predetermined heating time has elapsed, sealing members 86, 88 are retracted within elongate members 84 and the welds formed by sealing members 86, 88 are allowed to cool.

With the film tube gripped between elongate members 84, mechanical severing member 90 located between sealing members 86, 88 is extended to sever the plastic film between the two axially spaced, laterally extending seams 87 thereby separating package 10 from the remainder of film tube 58 that remains on forming tube 32. Sealing members 86 on members 84 are located between severing member 90 and dispensing end 40 and thus form a lateral seam 87 that seals closed end 60. Sealing members 88 are located between severing member 90 and conveyor system 96 and form the second closed end 61 of package 10.

Prior to opening jaw assembly 80, cool air is blown through orifices 92 to speed the cooling of the newly formed lateral seams 87. Once seams 87 have cooled sufficiently, jaw assembly 80 is opened. Batch of material 12 is now fully sealed within package 10 between closed ends 60, 61 and a new closed end 61 is positioned adjacent dispensing end 40. Package 10 is then conveyed away from apparatus 20 by conveyor system 96. For example, package 10 may be conveyed to a location where it is stacked on a pallet or otherwise prepared for shipping. After ram 26 has been fully retracted, a new batch of material 12 is loaded into compression chamber 22 and the cycle is repeated. In this regard, it is noted that the loading of a new batch of material 12 into compression chamber 12 may begin prior to completion of the sealing of ends 60, 61 by jaw assembly 80 and the conveyance of newly formed package 10.

Figure 22:
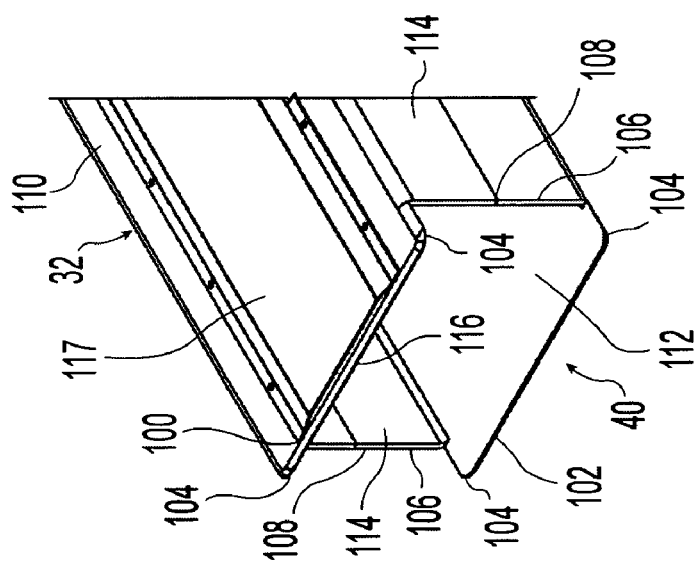
FIG. 22 is a perspective view of another dispensing end.

Dispensing end 40 of forming tube 32 is shown in FIG. 22 and includes first upper and second lower edges 100, 102 having rounded and beveled corners 104. Linear edges 100, 102 are parallel with each other and located on opposite sides of central axis 36. Edges 106 extend between upper and lower edges 100, 102 and are disposed on opposite sides of central axis 36 and include a recessed or cutout central portion 108. It is noted that elongate members 84 are disposed parallel with edges 100, 102 and as hydraulic cylinders 82 extend and retract moving elongate members 84 towards and away from each other in a direction perpendicular to central axis 36, members 84 remain substantially parallel with edges 100, 102. Thermal sealing members 86, 88, mechanical severing member 90 and rubber cords 94 are all also disposed parallel with edges 100, 102.

Although the linear edges 100, 102 form the upper and lower edges and edges 106 form side edges in the illustrated embodiment, alternative embodiments may spatially orient these edges differently. For example, edges 100, 102 could form vertically extending side edges with edges 106 forming horizontally extending upper and lower edges. In such an embodiment, jaw assembly 80 would also be rotated so that elongate members 84 would extend vertically and still be disposed parallel with first and second edges 100, 102 as members 84 were moved toward and away from each other. Thus, while edges 100, 102 are referred to herein as the upper and lower edges and edges 106 are referred to as the side edges, this is done merely to facilitate the description of the illustrated embodiment and does mean that these edges are limited to this particular orientation.

As can be seen in FIG. 22, forming tube 32 has an upper substantially planar panel 110 that forms edge 100, a lower substantially planar panel 112 that forms edge 102 and two substantially planar side panels 114 that form edges 106. The four planar panels 110, 112 and 114 that form receptacle 32 are arranged to form a substantially rectangular cross section.

Edges 100, 102 define an axial limit of forming tube 32 and project axially beyond central portion 108 of edges 106. In other words, edges 106 do not project axially beyond edges 100, 102 in the axial direction that batch of material 12 is ejected through dispensing end 40 and central portion 108 is axially recessed relative to edges 100, 102. Thus, while the portions of edges 106 proximate corners 104 may be at an axial location that is roughly equivalent to the axial location of edges 100, 102, the central portion 108 of edges 106 will be cutout and form a recess.

Figure 23:
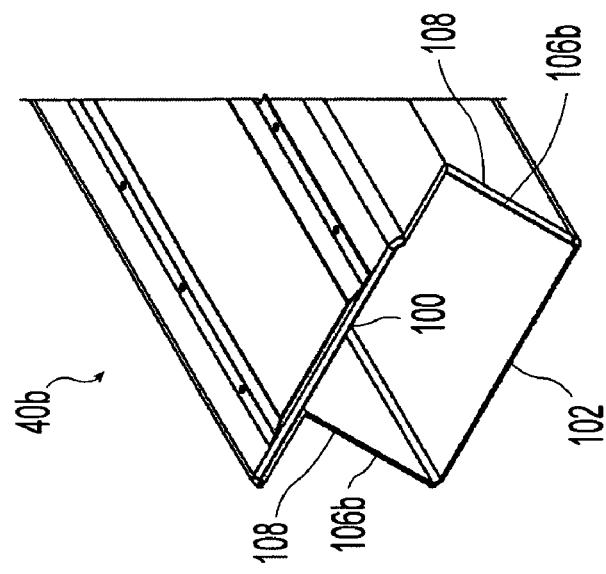
FIG. 23 is a perspective view of yet another dispensing end.
Figure 21:
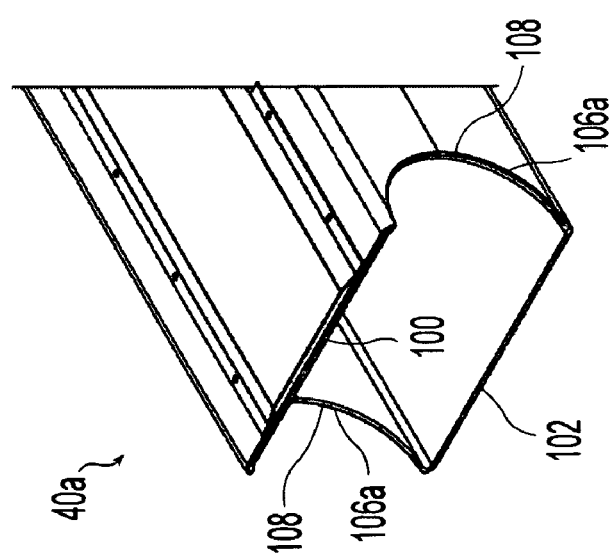
FIG. 21 is perspective view of a dispensing end of the forming tube.

In the embodiment of FIG. 22, edges 106 are linear and the entire length of edges 106 is recessed relative to edges 100, 102. FIGS. 21 and 23 illustrate alternative dispensing ends 40a, 40b wherein edges 106a, 106b still have recessed central portions 108 but which form an arcuate edge 106a (FIG. 21) or an angled edge 106b (FIG. 23). Still other variations on edges 106 can also be deployed with apparatus 20.

The recessed central portion 108 is used to initiate the folding of flaps on the film tube 58 when jaw assembly 80 is being closed. After ram 26 has been fully extended and ejected the batch of material 12 through dispensing end 40 and deposited the batch of material 12 between conveyor tracks 98, ram 26 is retracted. As ram 26 is retracted along axis 36 through dispensing end 40 and into forming tube 32 it forms a partial vacuum within film tube 58. As used herein, forming a partial vacuum within film tube 58 means that the air pressure within film tube 58 has been reduced to a pressure below the ambient environmental air pressure. Thus, the air on the exterior surface of film tube 58 will be greater than the air pressure within film tube 58 where there is a partial vacuum. As a result of this pressure differential, film tube 58 will tend to collapse inward. FIG. 10 illustrates the point at which ram 26 has been retracted into forming tube 32. The area designated by reference numeral 109 in FIG. 10 is the area on the side of film tube 58 that is being induced inward toward central axis 36 by the partial vacuum within film tube 58.

Corners 104 on dispensing end 40 limit the inward collapse of film tube 58 toward central axis 36 at the location of corners 104 and, similarly, the corresponding corners 105 on the ejected batch of material 12 located within the film tube will also limit the inward collapse of film tube 58 at the location of corners 105. The cutouts on side edges 106 will, however, allow film tube 58 to begin collapsing inward toward central axis 36 proximate the central portion 108 of side edges 106. This inward collapse of film tube at areas 109 proximate central portions 108 begins the formation of folded flaps 14 in the plastic material 52.

Figure 24:
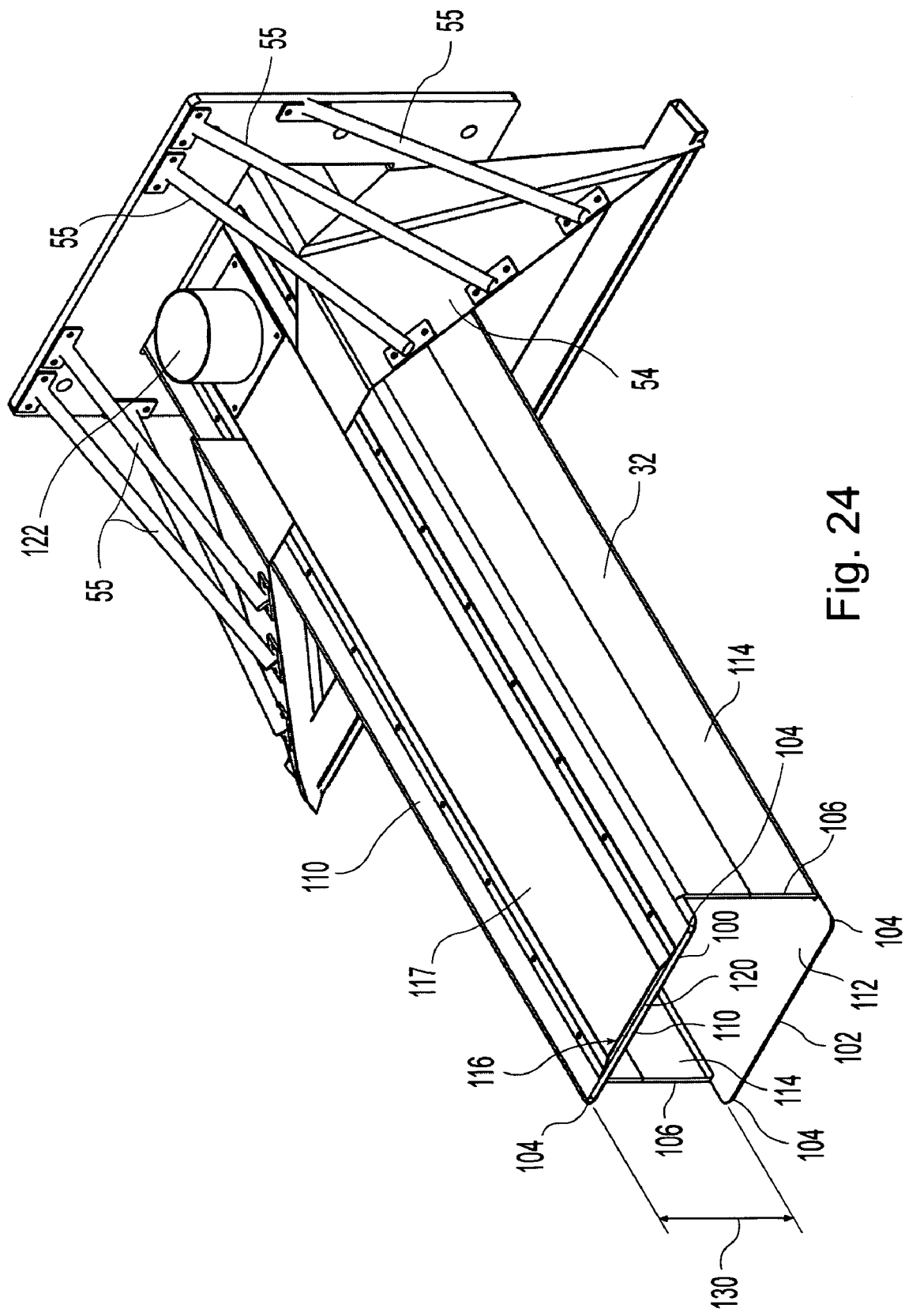
FIG. 24 is perspective view of the forming tube and folding hood.

An air duct 116 and apertures 118 in the face of ram 26 are used in combination with the reciprocal movement of ram 26 to limit the pressure differential between the interior and exterior of film tube 58. Air duct 116 has a first port 120 in fluid communication with an interior volume 57 of film tube 58 proximate dispensing end 40 and an opposite port 122 in communication with the ambient environment which acts as an air source. As can be seen in FIG. 24, air duct 116 is located on the outer surface of forming tube 32 and is formed by attaching an elongate strip of sheet metal 117 to panel 110 to form a space between the sheet metal material and panel 110. Air duct 116 extends for substantially all of the axial length of forming tube 32 with second port 122 being located behind folding hood 54 where it will be in communication with the surrounding environment.

As ram 26 is extended when forcing the batch of material 12 along forming tube 32 toward dispensing end 40, the movement of ram 26 will tend to increase the air pressure within film tube 58. Air duct 116 allows air to be expelled from the interior of film tube 57 into the surrounding environment through port 122 during this extension of ram 26 toward dispensing end 40. This expulsion of air through duct 116 prevents film tube 58 from being damaged or destroyed through over-inflation. Apertures 118 in the face of ram 26 and the clearance spaces between the outer edges of ram 26 and forming tube 32 also allow for the limited passage of air across the face of ram 26 as ram 26 displaces the batch of material 12 along forming tube 32. Apertures 118 also provide for the passage of air across the face of ram 26 after ram 26 has been extended beyond dispensing end 40.

After ram 26 has been fully extended and begins its retraction stroke, it will generate a partial vacuum between ram 26 and closed end 60 of film tube 58. Air duct 116 allows some/ limited air from the external environment to enter this low pressure zone through port 120. Apertures 118 and the clearance between ram 26 and forming tube 32 will also allow some air to enter this low pressure zone of film tube 58. While apertures 118 are effective for the full retraction stroke of ram 26, air duct 116 and the clearance between ram 26 and forming tube 32 only permit the entry of such air into the low pressure zone of film tube 58 after ram 26 has been retracted through dispensing end 40 back into forming tube 32. In other words, when ram 26 is extended beyond end 40, film tube 58 will directly engage the side edges of ram 26 and port 120 will be located to the rear of ram 26 and it will be only apertures 118 that provide for the passage of air across the face of ram 26 while ram 26 is extended beyond end 40.

It is noted that if ram 26 were retracted without any of these air passages permitting air entry into the low pressure zone of film tube 58, the vacuum created by the retraction of ram 26 would likely be too great for the strength of film tube 58 resulting in the damage or destruction of film tube 58. The size of air duct 116, apertures 118 and the ram clearance, however, is not so great as to prevent the formation of a partial vacuum within film tube 58 as ram 26 is retracted.

In some embodiments, air duct 116 is selectively opened and closed to control the entry and discharge of air through duct 116. For example, a valve can be placed in air duct 116 to control the passage of air through duct 116. Such a valve could be used to limit the passage of air through duct 116 during the retraction of ram 26 or even entirely close duct 116 to the passage of air therethrough. Air duct 116 is then re-opened to the passage of air for the remainder of the production cycle.

The closing of jaw assembly 80 while the partial vacuum is present within film tube 58 results in creation of folded flaps 14. As elongate members 84 are moved toward each other and compressively engage film tube 58, elongate members 84 maintain tension in two axially extending sections 126, 128 of film tube 58. The first of these two axially extending sections 126 extends from edge 100 of dispensing end 40 to a corresponding edge 101 on ejected batch of material 12. The second axially extending section 128 is located opposite the first section 126 and extends from edge 102 of dispensing end 40 to corresponding edge 103 on ejected batch of material 12. In the illustrated embodiment, section 126 extends the full lateral width of film tube 58 and defines the upper surface of film tube 58 while section 128 extends the full lateral width of film tube 58 and defines the lower surface of film tube 58. Each of the elongate members 84 engages a respective one of the axially extending sections 126, 128 and maintains a tensile load on the axially extending sections 126, 128 as the elongate members 84 are moved toward each other and compressively engage film tube 58 to provide resulting package 10 with neatly folded flaps 14.

As the tension in axially extending sections 126, 128 retains these sections in an unfolded condition, the air pressure differential between the interior and exterior of film tube 58 induces the inward movement of film material at central portions 108 on side edges 106 without allowing axially extending sections 126, 128 to collapse or slide laterally inward. FIGS. 11-13 illustrate elongate members 84 at approximately the midpoint of the closing of jaw assembly 80. In FIGS. 11-13, the area 109 of film tube 58 that is being drawn inward by the partial vacuum on the opposing sides of film tube 58 proximate central portions 108 of edges 106 can be seen.

Figure 17:
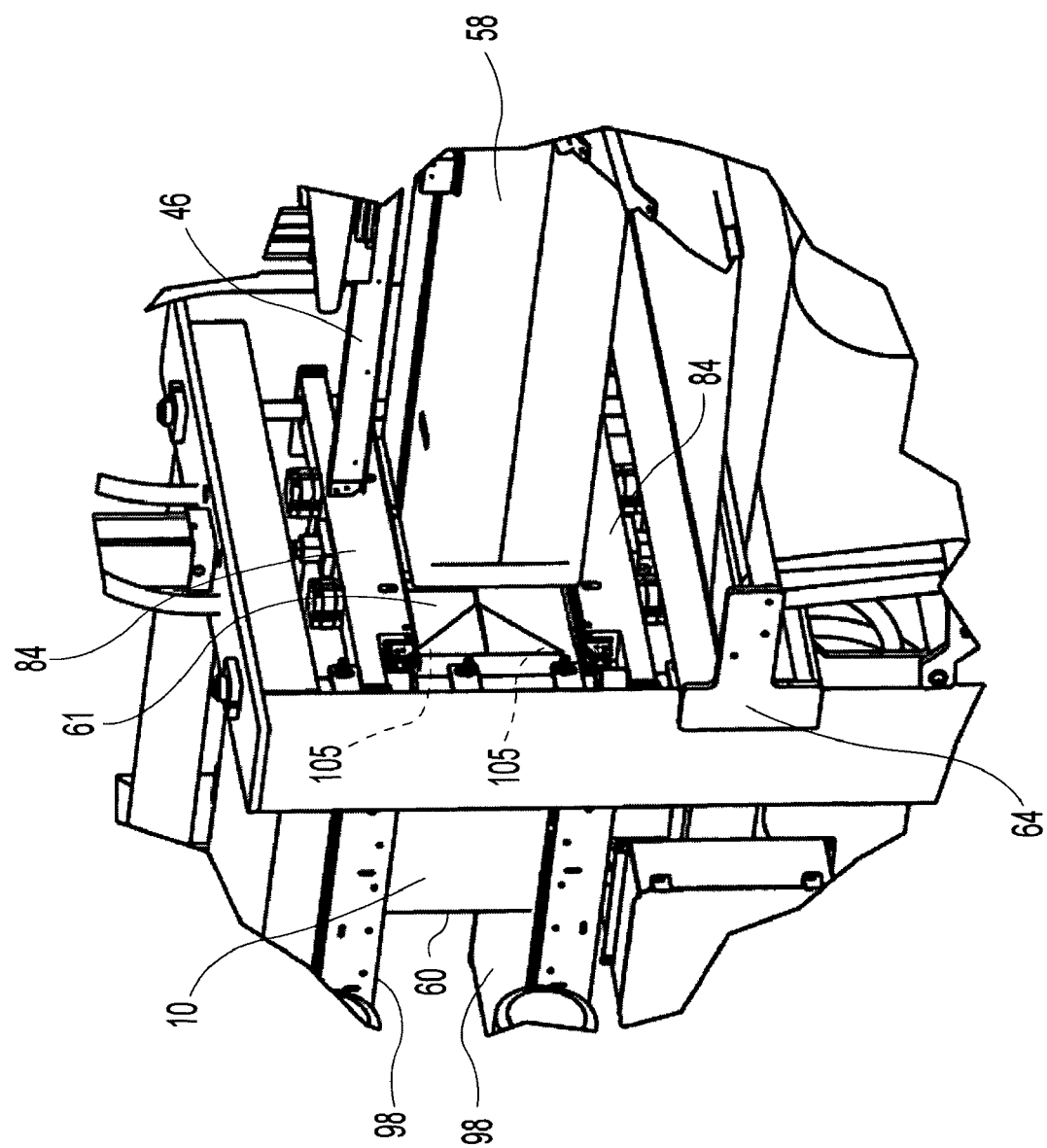
FIG. 17 is a perspective view of the dispensing end area.
Figure 18:
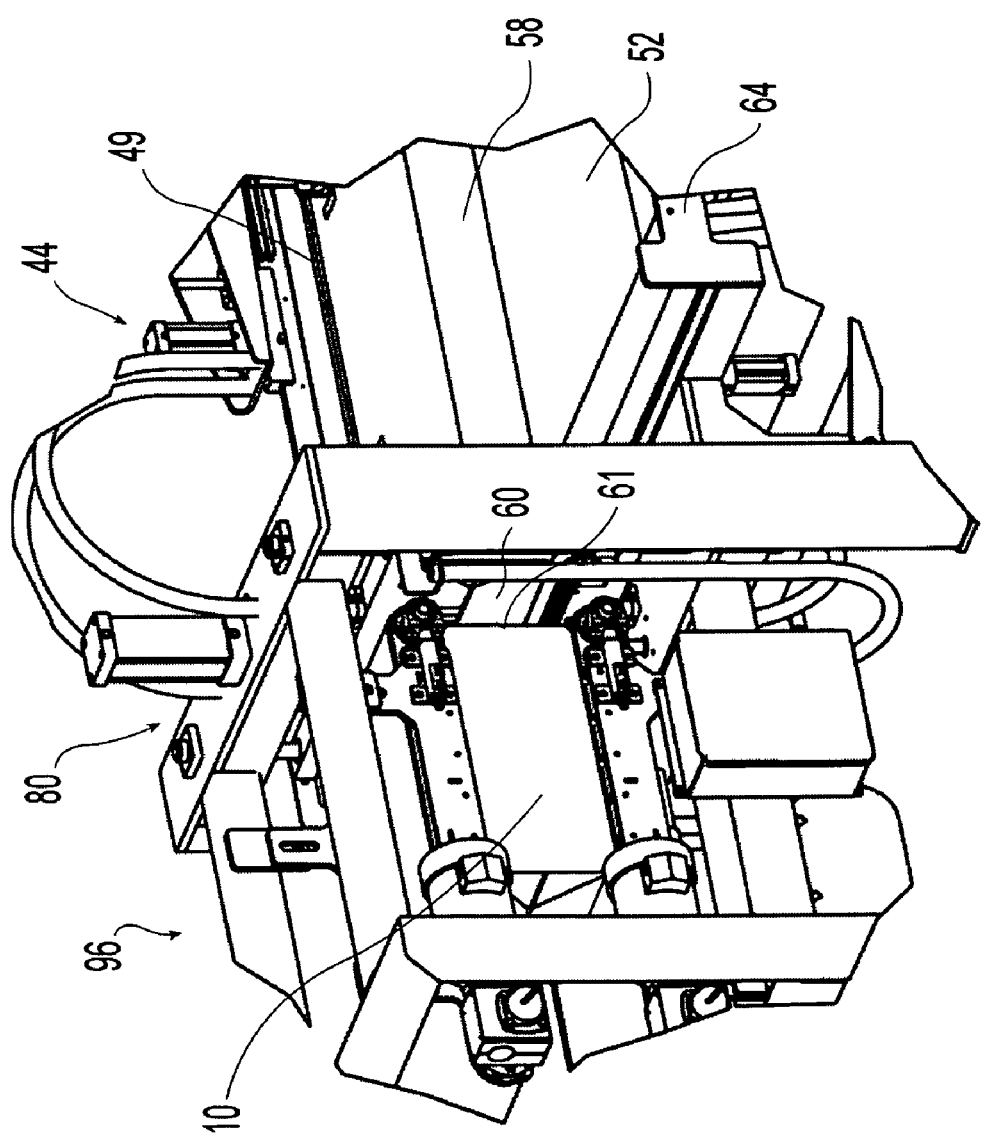
FIG. 18 is a perspective view of the dispensing end area.

This laterally inward movement of film material at area 109 proximate central portions 108 results in excess material 16 between sections 126, 128 being folded under axially extending sections 126, 128 along fold lines 18 to form folded flaps 14 as the two opposed sections 126, 128 are brought into contact by the closure of jaw assembly 80. The axially extending sections 126, 128 together with laterally extending seams 87 form the exterior surface of package 10 at closed ends 60, 61. As can be best understood with reference to FIGS. 1 and 1a, folded flaps 14 define a substantially triangular shaped flattened pocket along opposed edges of each of closed ends 60, 61 with fold lines 18 disposed at a substantially 45 degree angle relative to the edges of closed ends 60, 61. FIGS. 17 and 18 illustrate apparatus 20 after closed ends 60, 61 have been formed and jaw assembly 80 opened but newly formed package 10 has not yet been conveyed away.

The closure of jaw assembly 80 to form folded flaps 14 is done in cooperation with the provision of slack in film tube 58 between the ejected batch of material 12 and dispensing end 40 which prevents the tensile load imparted by the closing of jaw assembly 80 from becoming excessive and ripping the film material 52. In the illustrated embodiment, axial slack is provided by two separate actions. In one of these actions, apparatus 20 advances film tube 58 along forming tube 32 toward dispensing end 40 as jaw assembly 80 is closed to provide slack. This is accomplished by allowing lower rollers 66 to move upwards to permit film material 52 to be pulled off of forming tube 52 by the closing movement of jaw assembly 80. In this regard, it is noted that by allowing lower rollers 66 to move freely up and down while jaw assembly 80 is being closed, the upward movement of the lower rollers 66 not only allows for the provision of axial slack in film tube 58 but the weight of lower rollers 66 also maintains the desired level of tensile forces in film tube 58 between jaw assembly 80 and lower rollers 66.

In the second slack producing action, conveyor assembly 96 repositions batch of material 12 closer to dispensing end 40 as jaw assembly 80 is closed by activating conveyor tracks 98 and moving tracks 98 in cooperation with the closing movement of jaw assembly 80 to provide the necessary axial slack while still maintaining tension in axially extending sections 126, 128 of film tube 58 between jaw assembly 80 and the ejected batch of material 12. Both the starting and stopping as well as the speed of operation of conveyor tracks 98 and jaw assembly 80 are coordinated to provide the axial slack while maintaining the desired tension in film sections 126, 128.

Ideally, an equal amount of axial slack is provided by the upward movement of lower rollers 66 and the reverse motion of conveyor tracks 98. If an equal amount of slack is provided by these two actions, the film material 52 engaged with elongate members 84 will not slide axially relative to elongate members 84 as elongate members 84 are moved toward each other. If the amount of slack provided on the two opposite axial sides of elongate members 84 is not equal, sliding across elongate members 84 may occur and the cosmetic appeal of the finished end seal and folded flaps will likely be diminished. What is considered an acceptable cosmetic appearance will differ for various product markets and it generally will not be necessary to precisely equalize the quantity of slack provided on each of the two axial sides of elongate members 84 to achieve an acceptable cosmetic outcome. It is noted that elongate rubber cords 94 located on elongate members 84 enhance the frictional engagement between film tube 58 and elongate members 84 and thereby serve to grip film tube 58 and limit both the axial and lateral sliding of axially extending sections 126, 128 relative to elongate members 84 as jaw assembly 80 is being closed. Package 10 illustrated in FIG. 1 is a schematically depicted example of a package formed by apparatus 20 wherein the axial slack provided by the movement of conveyor tracks 98 and lower rollers 66 is substantially equal.

Various other factors can also influence the final cosmetic appearance of closed ends 60, 61. Two such factors are the axial distance between jaw assembly 80 and dispensing end 40 and the axial distance between jaw assembly 80 and the position of batch of material 12 after this material has been fully ejected by ram 26. The cosmetic appearance can be enhanced by controlling these axial distances relative to the distance between product edges 101 and 103. This product dimension, in turn, is a function of the distance 130 by which upper and lower edges 100, 102 of dispensing end 40 are spaced apart (FIG. 24).

Figure 5:
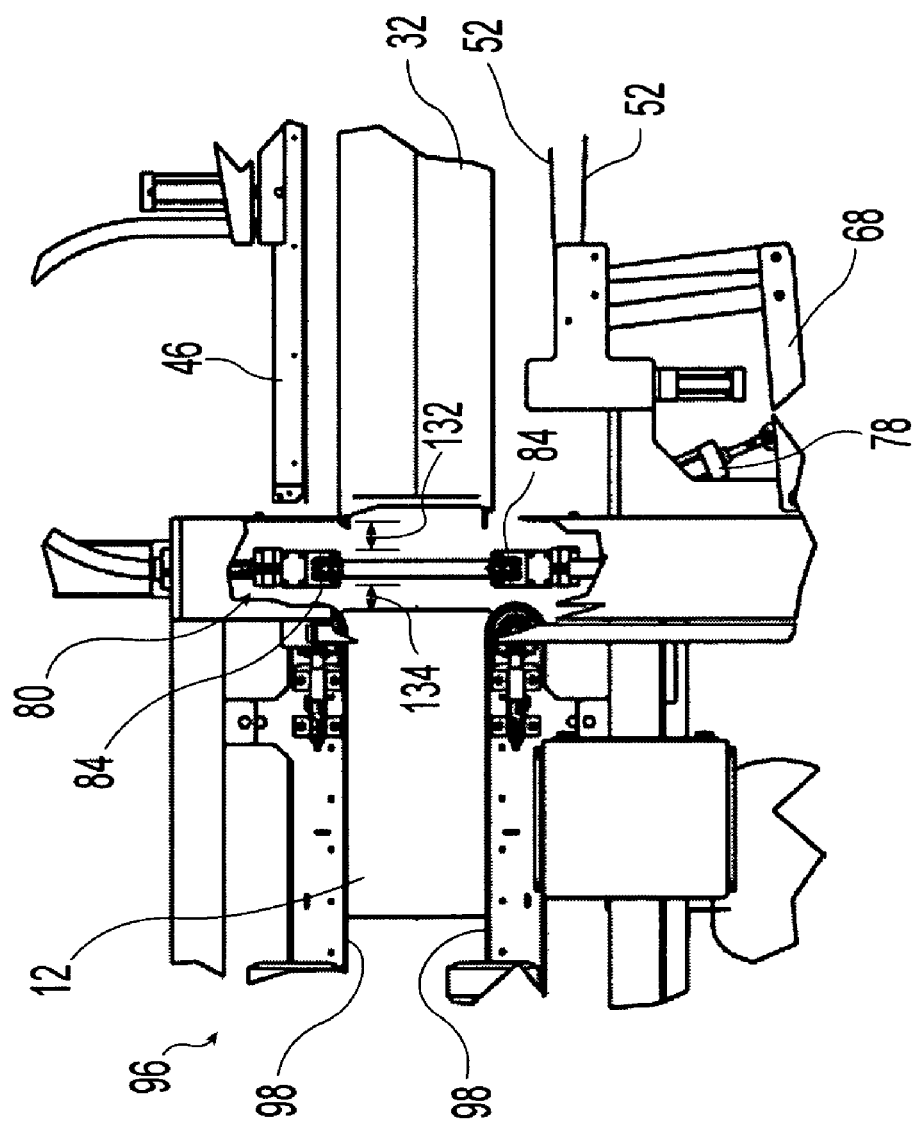
FIG. 5 is a partial cutaway view of the sealing assembly.
Figure 6:
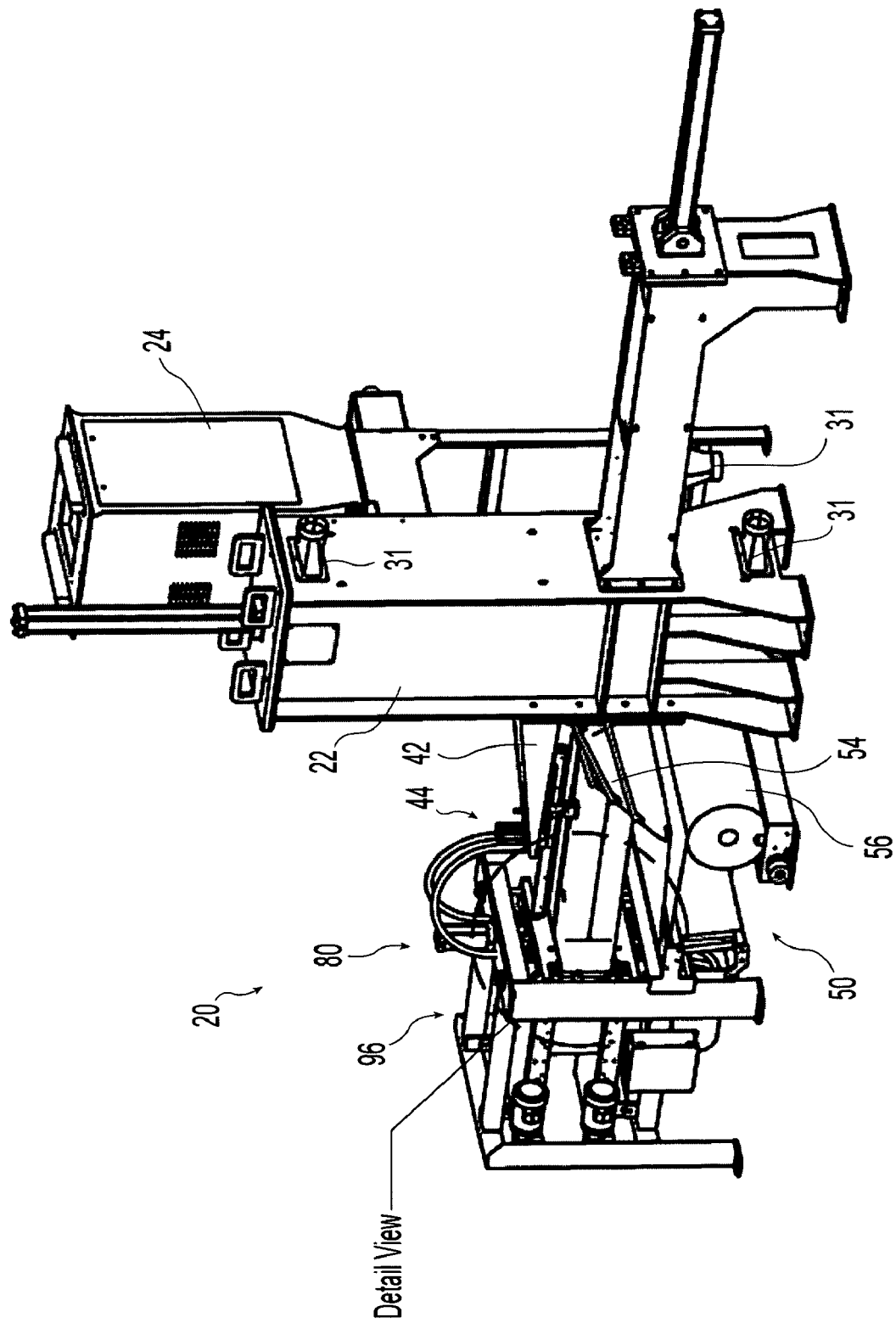
FIG. 6 is a perspective view of the packaging apparatus.
Figure 7:
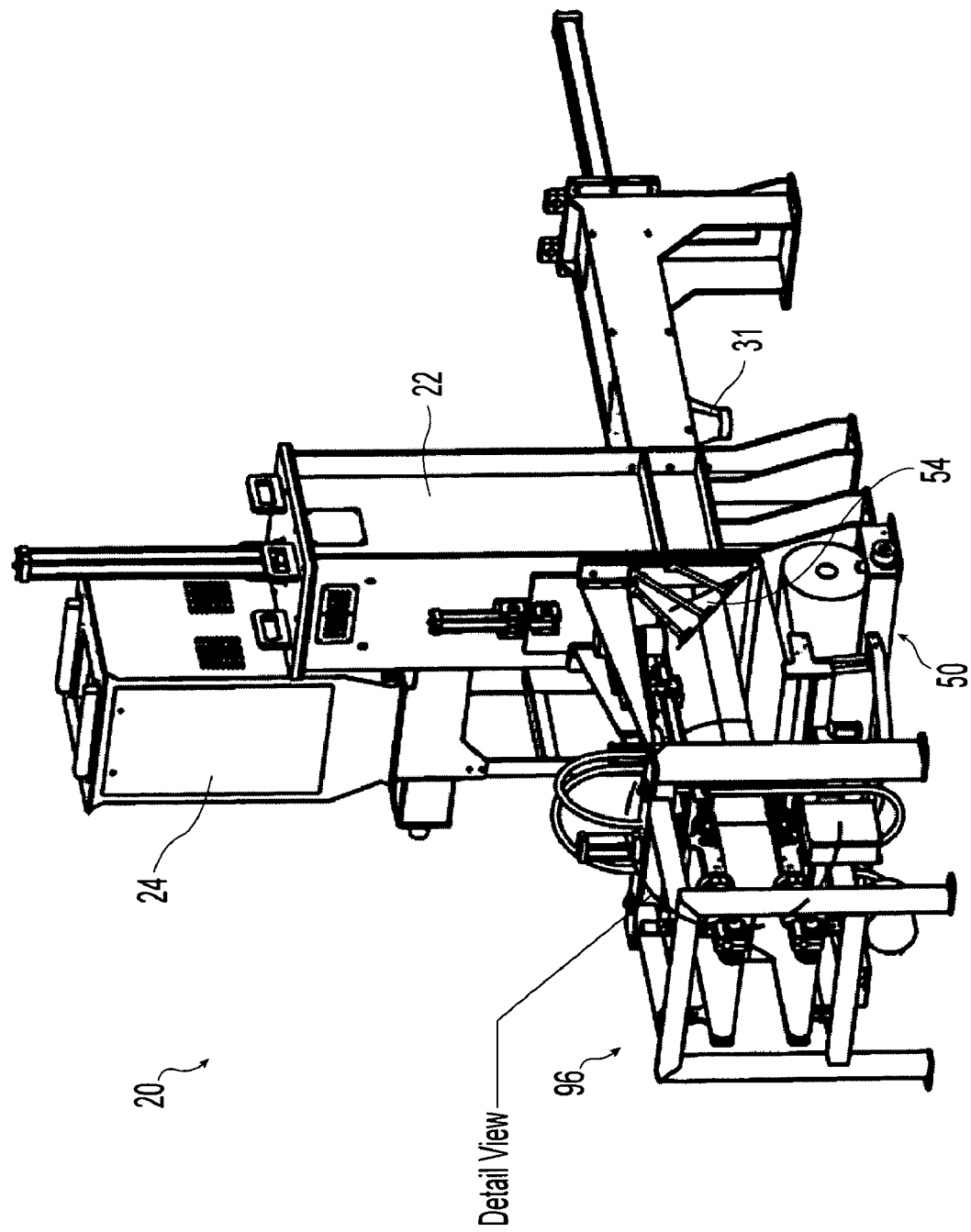
FIG. 7 is another perspective view of the packaging apparatus.
Figure 8:
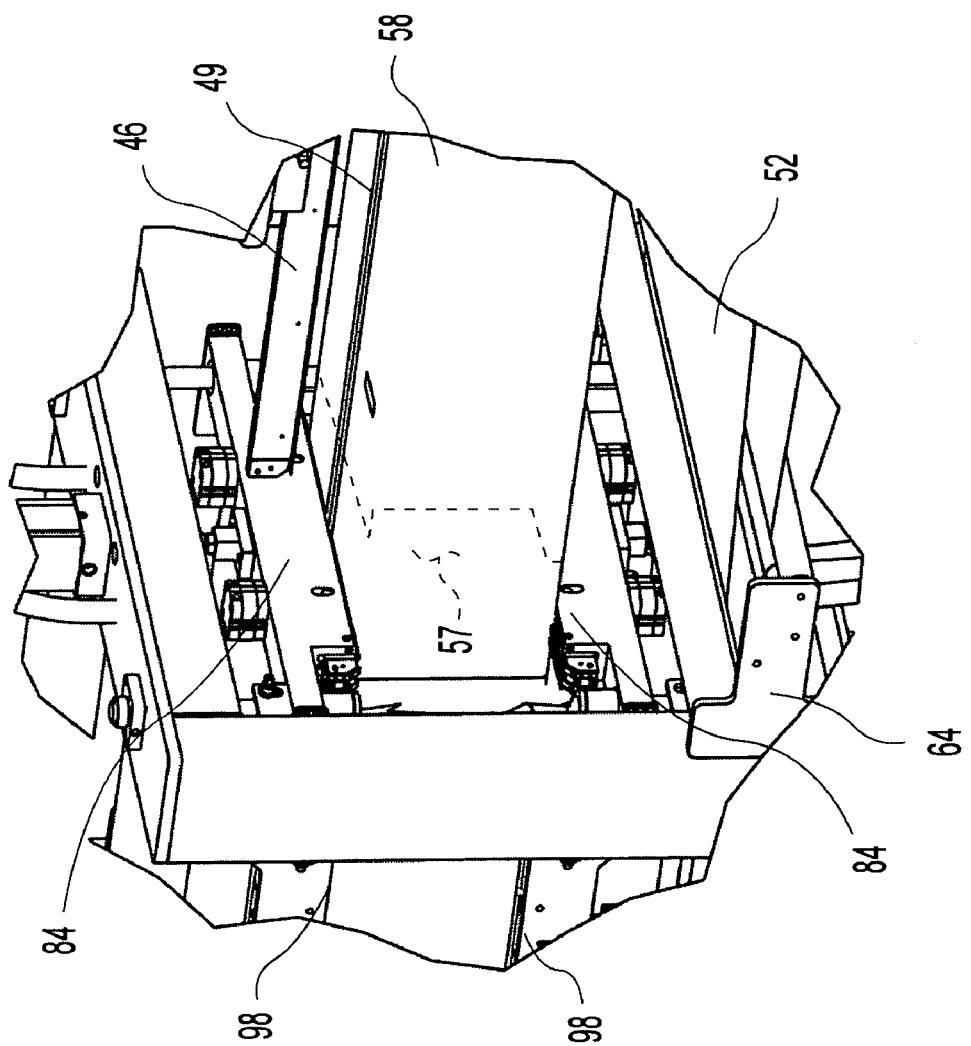
FIG. 8 is an enlarged view of the Detail View area of FIG. 6.
Figure 9:
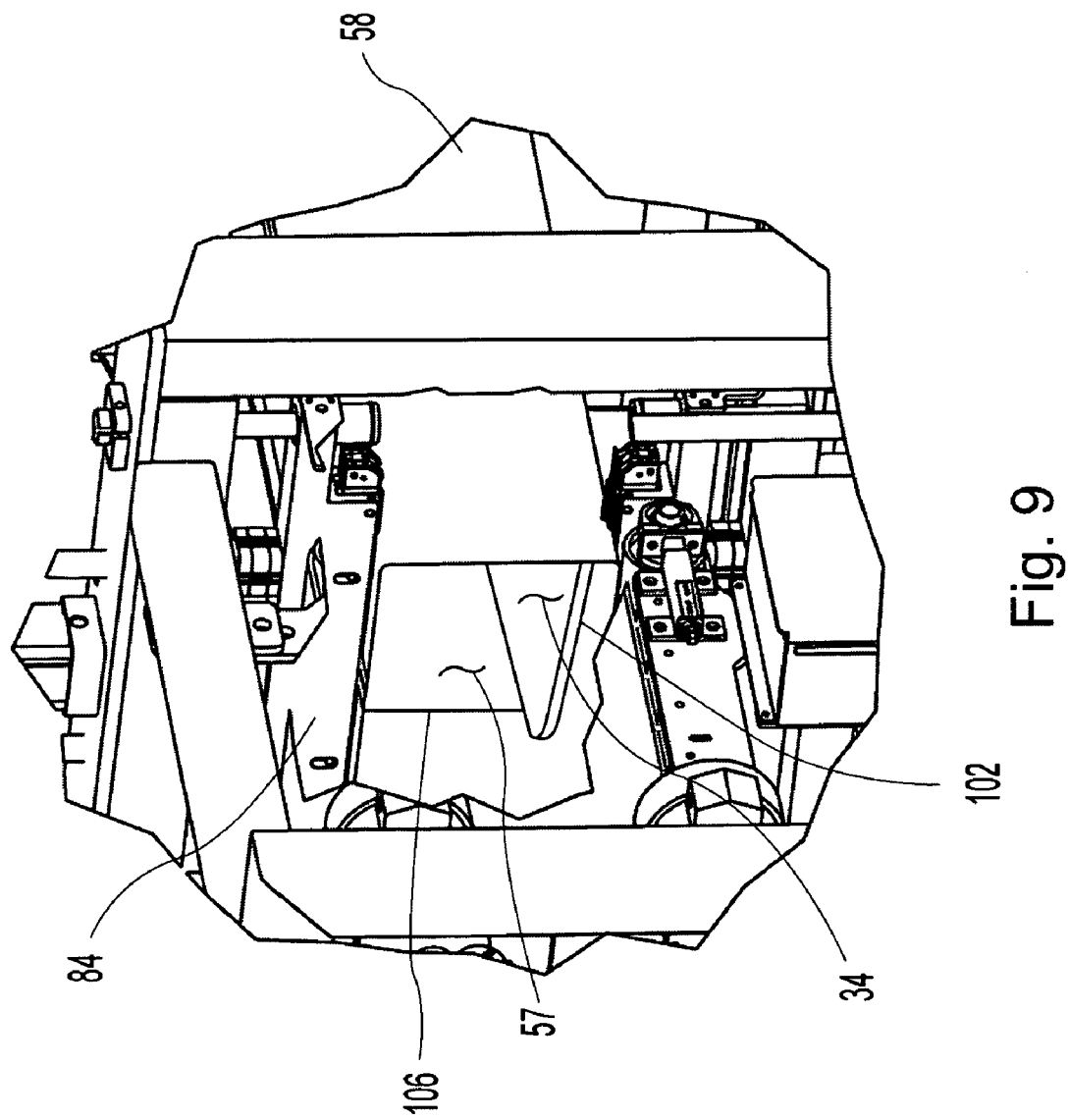
FIG. 9 is an enlarged partial cutaway view of the Detail View area of FIG. 7.

For the first of the above mentioned factors, it has been found that the formation of folding flaps is facilitated by positioning jaw assembly 80 such that elongate members 84 are positioned an axial distance 132 (FIG. 5) from dispensing end 40 that is between approximately one-third and approximately one-half the value of the distance 130 between edges 100, 102. For the second above-mentioned factor, it has been found that the formation of folding flaps is promoted by extending ram 26 to a distance such that the ejected batch of material 12 is pushed an axial distance 134 (FIG. 5) beyond elongate members 84 that is approximately one-half the value of distance 130 when the closure of jaw assembly 80 is initiated and prior to the provision of any slack in film tube 58 between ejected batch of material 12 and dispensing end 40.

The physical characteristics of material 12 that is being packaged can also have an impact on the cosmetic appearance of finished package 10. For example, the product density, product memory (i.e., the degree to which the product springs back to original shape after compression if the product is compressed during packaging) and the product geometry (i.e., physical shape of individual product components within the batch which affect how well the collection of components forming the batch retains its shape after being released from compression if the product is compressed during packaging) can all have an impact and influence the setting of distances 132, 134. As a practical matter, after apparatus 20 has been assembled, it is distance 134 which can be most easily adjusted by varying the distance by which ram 26 is extended beyond dispensing end 40.

Although the illustrated apparatus 20 includes a conveyor system 96, the use of a conveyor system 96 with apparatus 20 is not required. When an apparatus 20 without a conveyor system 96 is being used, the expansion of material 12 after ram 26 is retracted can be a factor in the determination of distance 134. In the absence of any product expansion after retraction of ram 26, distance 134 will be determined by the distance between product edges 101 and 103 and the axial length of laterally extending seam 87. To the extent that the material 12 expands in the axial direction as ram 26 is retracted, distance 134 is ideally increased to account for the axial expansion that will occur prior to closure of jaw assembly 80.

Where apparatus 20 includes a conveyor system 96, it will generally be desirable to extend ram 26 until the ejected batch of material 12 within film tube 58 is held between conveyor tracks 98 but not beyond this distance. The position of the ejected batch of material 12 when ram 26 is retracted may not correspond to the desired distance 134 (which may also need to be adjusted for product expansion). Thus, after ram 26 begins its retraction and before the closure of jaw assembly 80 is initiated, the conveyor system 96 can be used to adjust the position of the ejected batch of material 12 to place it at the desired axial position 134 before initiating the closure of jaw assembly 80. This will typically mean that conveyor system 96 first moves the ejected batch of material 12 axially away from dispensing end 40 pulling additional film material off of forming tube 32, then the closure of jaw assembly 80 is initiated and, after engaging elongate members 84 with film tube 58, conveyor system 96 reverses motion (to provide axial slack) and begins moving the ejected batch of material 12 toward dispensing end 40 as elongate members 84 compressively engage film tube 58 and move towards each other.

FIG. 19 illustrates ram 26 after it has ejected batch of material 12 and begun its retraction but has not yet been pulled back through the open jaw assembly 80 and into forming tube 32. Thus, FIG. 19 illustrates a point in the packaging process when, if material 12 is expanding in an axial direction, that expansion will have an impact on the desired positioning of the ejected batch of material 12 relative to jaw assembly 80.

Figure 20:
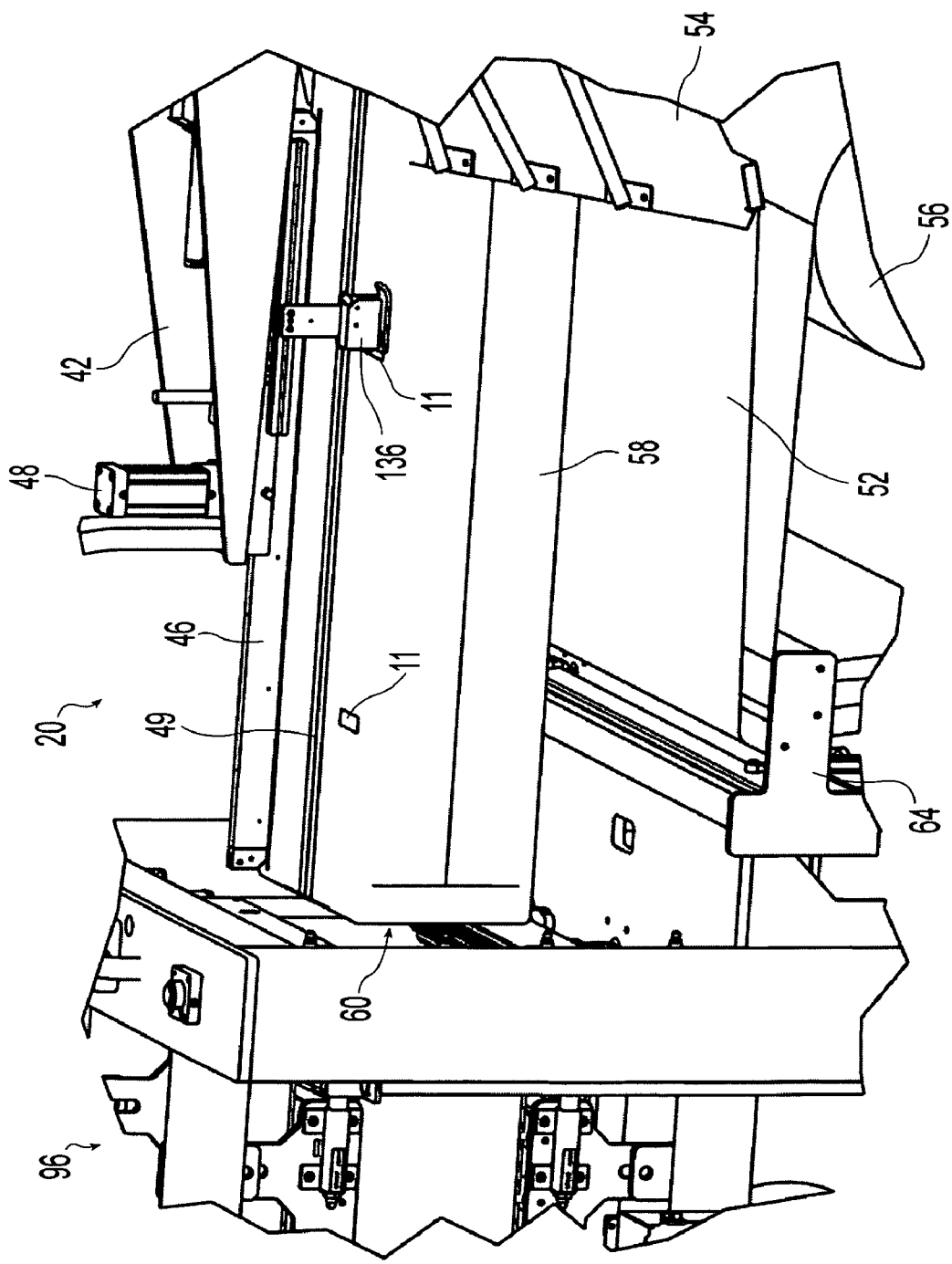
FIG. 20 is perspective view showing a film registration photo-eye.

For some applications, the film material 52 will have pre-printed features that must be properly positioned on the final package 10. Where such pre-printed features are employed, it can be desirable to use a light sensor or photo-eye 136 (FIG. 20) to detect pre-printed registration marks 11 (FIGS. 1 and 20) on film material 52 so that the pre-printed features will be properly positioned on package 10. In such applications, apparatus 20 will typically include a conveyor system 96 and ram 26 will push the ejected batch of material 12 out of dispensing end 40 by a distance beyond jaw assembly 80 that is less than distance 134. Conveyor system 96 will then continue to advance the ejected batch of material 12 until the photo-eye 136 detects the next registration mark 11 which will thereby control the value of distance 134. The use of such photo-eye registration systems to control the positioning of pre-printed materials on packages 10 is known to those having ordinary skill in the art.

While many types of loose material 12 will retain their general shape and form as ram 26 is retracted, some materials, such as very fine wood products having properties similar to sawdust, will not hold their shape well after compression. The corners 105 formed by such materials can have a tendency to collapse inward as ram 26 is retracted and forms a partial vacuum within film tube 58. For such easily collapsible materials, the forward stroke of ram 26 can be stopped short of jaw assembly 80 and conveyor system 96 can be used to pull the material away from dispensing end 40 through jaw assembly 80. The closing stroke of jaw assembly 80 in which elongate members 84 are moved toward each other is then initiated prior to the retraction of ram 26.

By initiating the closing stroke of jaw assembly 80 prior to the retraction of ram 26, elongate jaw members 84 will provide some support to the material within film tube 58 and the material will be less likely to be collapsed due to the partial vacuum formed when ram 26 is retracted. Here, ram 26 is retracted and forms a partial vacuum within film tube 58 for at least a portion of the closing stroke of jaw assembly 80. By retracting ram 26 to form the partial vacuum before elongate jaw members 84 have been fully pressed together at the completion of the closing stroke, a suitable folded flap can still be formed in the film material. In other words, for such easily collapsible materials, suitable folding flaps can still be achieved by initiating the retraction of ram 26 slightly before, immediately upon or slightly after elongate jaw members 84 contact film tube 58. By contacting film tube 58 with elongate jaw members 84 to create tension in the upper and lower film tube sections 126, 128 before or substantially simultaneously with the creation of a partial vacuum within film tube 58, the inward collapse of material corners 105 can be inhibited.

While this invention has been described as having an exemplary design, the present invention may be further modified within the spirit and scope of this disclosure. This application is therefore intended to cover any variations, uses, or adaptations of the invention using its general principles.

What is claimed is:

1. An apparatus for packaging a batch of material within a plastic film material, said apparatus comprising:
   a receptacle adapted to receive the batch of material, said receptacle defining a central axis and having a dispensing end, said dispensing end defining an opening and including first and second substantially linear opposed edges wherein said first and second edges are disposed substantially parallel and on opposite sides of said central axis, said dispensing end further including third and fourth edges extending between said first and second edges and disposed on opposite sides of said central axis, said first and second edges defining an axial limit of said receptacle and projecting axially beyond a central portion of said third and fourth edges;

a ram axially moveable within said receptacle and engageable with the batch of material to thereby displace the batch of material along said central axis;

a film dispensing assembly dispensing the plastic film material and forming the plastic film material into a film tube about said receptacle; and first and second elongate members disposed substantially parallel with said first and second edges, said elongate members being moveable toward and away from each other in a direction substantially perpendicular to said central axis; and wherein operation of said apparatus includes axially extending said ram to eject the batch of material through said dispensing end into the film tube and subsequently retracting the ram into said receptacle to form at least a partial vacuum within the film tube between the batch of material and said ram and moving the first and second elongate members toward each other in a closing stroke to compressively engage the film tube between the batch of material and said dispensing end and wherein the partial vacuum is present in the film tube for at least a portion of the closing stroke to thereby form folded flaps in the film tube.

2. The apparatus of claim 1 wherein at least one of said first and second elongate members includes at least one elongate thermal sealing member extending substantially parallel with said first and second edges, said thermal sealing member being engageable with the film tube when said first and second elongate members are moved toward each other and wherein, when said first and second elongate members compressively engage the film tube, said thermal sealing member is heated to thereby heat seal the film tube and form a closed end on the film tube.

3. The apparatus of claim 1 wherein at least one of said first and second elongate members includes first and second elongate thermal sealing members and an elongate mechanical severing member each extending substantially parallel with said first and second edges and with said mechanical severing member disposed between said first and second thermal sealing members, each of said first and second thermal sealing members and said mechanical severing member being engageable with the film tube when said first and second elongate members are moved toward each other and wherein, when said first and second elongate members compressively engage the film tube, said first and second thermal sealing members are heated to thereby heat seal the film tube and form first and second closed ends on the film tube and said mechanical severing member severs the film tube between said first and second closed ends.

4. The apparatus of claim 1 wherein said apparatus advances the film tube along said receptacle toward said dispensing end as said first and second elongate members compressively engage the film tube.

5. The apparatus of claim 1 further comprising a conveyor assembly positioned to receive the batch of material discharged through said dispensing end and disposed within the film tube, said conveyor assembly repositioning the batch of material closer to said dispensing end as said first and second elongate members compressively engage the film tube.

6. The apparatus of claim 5 wherein said apparatus advances the film tube along said receptacle toward said dispensing end as said first and second elongate members compressively engage the film tube.

7. The apparatus of claim 1 further comprising an air duct in communication with an interior volume of the film tube proximate said dispensing end, said air duct selectively providing fluid communication between the interior volume of the film tube proximate said dispensing end and an air source.

8. The apparatus of claim 7 wherein said air duct extends along said receptacle from said dispensing end to an external port in communication with the ambient environment.

9. The apparatus of claim 1 wherein said first and second edges are spaced apart by a first distance and said first and second elongate members are positioned at an axial distance from said first and second edges that is between approximately one-third and approximately one-half the value of said first distance.

10. A method of packaging a loose material, said method comprising:

providing a receptacle defining a central axis and having a dispensing end wherein the dispensing end defines an opening and includes first and second substantially linear opposed edges, the first and second edges being disposed substantially parallel and on opposite sides of the central axis, the dispensing end further including third and fourth edges extending between the first and second edges and disposed on opposite sides of the central axis, the first and second edges defining an axial limit of the receptacle and projecting axially beyond a central portion of the third and fourth edges;

placing a batch of loose material in the receptacle;

forming a plastic film tube about the receptacle wherein the film tube includes a first closed end positioned proximate the dispensing end of the receptacle;

extending a ram within the receptacle and through the dispensing end to eject the batch of material through the dispensing end into the film tube and simultaneously axially advance the film tube wherein the batch of material is disposed within the film tube adjacent the first closed end at a position axially spaced from the dispensing end after ejecting the batch of material through the dispensing end;

providing first and second elongate members which are disposed substantially parallel with the first and second edges of the dispensing end and which are moveable toward and away from each other in a direction substantially perpendicular to the central axis;

forming at least one folded flap in the film tube by moving the first and second elongate members toward each other in a closing stroke and compressively engaging the first and second elongate members with the film tube at a location between the ejected batch of material and the dispensing end of the receptacle and forming at least a partial vacuum in the film tube between the batch of material and the dispensing end of the receptacle during at least a portion of the closing stroke; and providing slack in the film tube between the ejected batch of material and the dispensing end during the step of forming the folded flap.

11. The method of claim 10 wherein forming a partial vacuum includes retracting the ram through the dispensing end into the receptacle.

12. The method of claim 10 wherein the step of providing slack in the film tube includes moving the ejected batch of material toward the dispensing end.

13. The method of claim 10 wherein the step of providing slack in the film tube includes axially advancing the film tube along the receptacle.

14. The method of claim 13 wherein the step of providing slack in the film tube further comprises moving the ejected batch of material toward the dispensing end.

15. The method of claim 10 wherein the step of compressively engaging the film tube between the first and second elongate members includes heat sealing the film tube across the lateral width of the film tube and axially severing the film tube.

16. The method of claim 10 wherein the step of compressively engaging the film tube between the first and second elongate members includes heat sealing the film tube at two separate axially spaced locations across the lateral width of the film tube and axially severing the film tube between the two separate axially spaced locations.

17. The method of claim 10 wherein the first and second edges are spaced apart by a first distance and the first and second elongate members are positioned at an axial distance from the first and second edges that is between approximately one-third and approximately one-half the value of the first distance.

18. The method of claim 17 wherein an axial distance between the first and second elongate members and the ejected batch of material is approximately one-half the value of the first distance when the first and second elongate members first initiate movement towards each other during the step of forming the at least one folded flap and prior to performing the step of providing slack.

19. The method of claim 10 wherein the film tube includes a first axially extending section extending from the first edge of the dispensing end to a corresponding first product edge on the ejected batch of material and a second axially extending section opposite the first section extending from the second edge of the dispensing end to a corresponding second product edge on the ejected batch of material, the first and second elongate members respectively engaging the first and second sections and maintaining respective tensile loads on the first and second sections as the first and second elongate members move toward each other and compressively engage the film tube.

20. The method of claim 19 wherein the step of providing slack in the film tube includes moving the ejected batch of material toward the dispensing end.

21. The method of claim 19 wherein the step of providing slack in the film tube includes axially advancing the film tube along the receptacle.

* * * * *